United States Patent
Higuma et al.

(10) Patent No.: US 7,133,077 B2
(45) Date of Patent: Nov. 7, 2006

(54) AUTO FOCUS CAMERA, LENS APPARATUS AND CAMERA SYSTEM WITH A VIBRATION MOTOR DRIVE

(75) Inventors: Kazuya Higuma, Tochigi (JP); Ryoichi Suzuki, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 958 days.

(21) Appl. No.: 10/189,073

(22) Filed: Jul. 2, 2002

(65) Prior Publication Data

US 2003/0020825 A1    Jan. 30, 2003

(30) Foreign Application Priority Data

Jul. 2, 2001  (JP)  ............................. 2001/201147
Sep. 11, 2001  (JP)  ............................. 2001/275581

(51) Int. Cl.
G03B 13/00   (2006.01)
H04N 5/232   (2006.01)

(52) U.S. Cl. ...................................... 348/345; 348/354

(58) Field of Classification Search ................ 348/345, 348/348, 351, 353, 354, 357, 335
See application file for complete search history.

(56) References Cited

U.S. PATENT DOCUMENTS 6,876,391 B1 *  4/2005  Hashimoto ................. 348/345

FOREIGN PATENT DOCUMENTS

JP   8-80073   3/1996

OTHER PUBLICATIONS

English Machine Translation of JP 08-080073 A.*

* cited by examiner

Primary Examiner—Vivek Srivastava
Assistant Examiner—Nelson D. Hernandez
(74) Attorney, Agent, or Firm—Morgan & Finnegan, LLP

(57) ABSTRACT

A camera comprising the following components is disclosed:

a vibrating motor which drives a focus lens of an image-taking optical system, and a control circuit which controls the vibrating type motor to repeatedly drive and stop the focus lens, extracting higher frequency components from an image signal obtained from an image pickup device in each stopped state of the focus lens, and performing focus adjusting operation of moving the focus lens to an in-focus position in accordance with a focus adjustment state of the image-taking optical system determined on the basis of the higher frequency components.

The control circuit causes traveling wave vibration to be generated on the vibrating member of the vibrating type motor when the focus lens is driven and causes standing wave vibration to be generated on the vibrating member while the focus lens is stopped during the focus adjusting operation.

1 Claim, 20 Drawing Sheets

AUTO FOCUS CAMERA, LENS APPARATUS AND CAMERA SYSTEM WITH A VIBRATION MOTOR DRIVE

BACKGROUND OF THE INVENTION

1. Field of the Invention

The present invention relates to a camera, a lens apparatus, and a camera system which are provided with an autofocus mechanism, and more particularly, to those which use a vibrating type motor to drive focusing in an image-taking optical system.

2. Description of the Related Art

A vibrating type motor, also referred to as an vibration wave motor or the like, produces output in such a manner that two-phase cycle signals with different phases are applied to electro-mechanical energy conversion elements (electrostrictive elements) provided for a vibrating member to cause the vibrating member to vibrate in a traveling wave (that is, to generate a traveling vibration wave on a surface of the vibrating member), thereby driving a moving (driven) member in press contact with the vibrating member by friction. In the vibrating type motor, the vibrating member is made non-vibrating to hold the position of the moving member by a frictional force acting between the vibrating member and the moving member.

Since such a vibrating type motor is characterized by high torque at low rotational speed, driving noise hardly produced, favorable responsiveness and the ability to accurately control positions, it is used for autofocus drive in cameras, interchangeable lenses or the like.

For autofocus (AF) schemes of cameras or the like, an AF system employing a phase difference detection scheme is used in many models of cameras of a so-called single-lens reflex camera type in which images are taken on silver films. The AF system of the phase difference detection scheme operates as follows.

As shown in FIG. 12, light flux incident through an image-taking lens is reflected to a lower portion of a camera by a sub-mirror 502 attached to the back of a semi-transparent main mirror 501 disposed at an angle of 45 degrees to an image-taking optical axis L. The reflected light flux passes through an infrared cutting filter 504, and is divided into two parts by a field lens 503 of a secondary optical system. The two parts of light flux form two images on a pair of AF sensors in an AF sensor unit 505 through a secondary imaging lens 508.

The paired AF sensors 506, 507 are disposed side by side and produce outputs as shown in FIG. 13. A difference in spacing between the outputs from the two images formed on the paired AF sensors 506, 507 is relied on to determine an in-focus, a front-focus, or a back-focus state. Focusing is achieved by moving a focus lens such that the spacing between the outputs of the images matches the spacing in the in-focus state.

The amount of the movement of the focus lens, that is, the amount of movement of an image surface, is determined by calculation from the spacing between the outputs of the two images with the following algorithm.

First, the outputs from the two AF sensors 506, 507 are acquired as data, and the correlation is examined between the outputs from the two sensors 506, 507. The correlation is determined with "the MIN algorithm" in which a correlation U0 is calculated as:

$$U0 = \sum_{j}^{m} \min(A[j], B[j])$$

(min(a,b) refers to a smaller one of a and b) where data from the sensor 1 (506) is represented by A[1]–A[n] and data from the sensor 2 (507) is represented by B[1]–B[n].

After the calculation of the U0, a correlation U1 is calculated between data on an image A shifted by one bit in the AF sensor and the data on an image B as shown in FIG. 14. The U1 is represented as:

$$U1 = \sum_{j}^{m} \min(A[j+1], B[j])$$

Correlations are successively calculated from images shifted on a bit-by-bit basis. The correlation is at a maximum value when two images match, and the amount of shift at the maximum value is found. From data in the neighborhood of the value, a true maximum value of the correlation is obtained by interpolation. The amount of shift at the true maximum value is considered as an amount of displacement.

Since an optical system has a unique relationship between the amount of displacement and the amount of movement of an image surface, that is, a so-called defocus amount, the amount of defocus is determined from the amount of displacement. An amount of movement of the focus lens is found from the defocus amount, and the lens is moved to achieve focusing.

As described above, the AF of the phase difference detection scheme detects a defocus amount for a subject, so that it is possible to determine in which direction the focus lens should be driven by what amount to achieve focusing by calculations based on the detected defocus amount. Thus, achieving focusing requires lens driving only once, and fast, quiet and accurate AF control can be performed while the characteristics of the vibrating type motor are made use of. For this reason, a number of commercially manufactured cameras or interchangeable lenses are equipped with the phase difference scheme AF and the vibrating type motor.

On the other hand, in a digital camera which acquires images by a two-dimensional image pickup device and electrically records an image signal on a recording medium, an AF scheme referred to as a contrast detection scheme is employed.

The contrast detection scheme AF generally operates as follows. The configuration thereof has an image-taking system including a two-dimensional image pickup device, a system control section including a calculation circuit and a circuit for producing a control signal for driving a focus lens, and a lens section including a lens control circuit for moving the focus lens in an optical axis direction.

The image-taking system admits image light, and outputs and sends it as an image signal to the system control section which in turn extracts higher frequency components included in the image signal. The maximum value of the extracted signal is stored. The focus lens is moved by a certain amount in a certain direction. Then, image light is again admitted and higher frequency components are extracted.

When the maximum value of the extracted signal is larger than the previously stored value, the focus lens is considered as moving toward an in-focus position. The current value is newly stored and the focus lens is moved in the same direction.

When the current maximum value of the extracted signal is smaller than the previous one, the focus lens is considered as moving away from the in-focus position. The current value is newly stored and the focus lens is moved by a certain amount in a direction opposite to the previous moving direction. Then, image light is again admitted, higher frequency components are extracted, and the maximum value is compared with the newly stored one. The image surface is finally caused to reach the in-focus position.

Description is made with reference to FIG. 15. The horizontal axis of the graph in FIG. 15 represents the position of an image surface and the vertical axis represents the maximum value of higher frequency components. A point a indicates the position of an image surface at a starting point and a point b indicates the in-focus plane. The maximum value of higher frequency components at the point a is assumed as "A." The focus lens is then moved to the right in the graph, that is, in a direction toward the in-focus plane. The maximum value of higher frequency components at a point a' after the movement is "A'" and a comparison between them shows that A' is larger than A. The focus lens is thus continuously moved in the same direction.

After several comparisons, A is larger than A" (A" is the maximum value at a point a") at an image surface position past the point b, and it is possible to determine that the focus lens is now moving in a direction away from the in-focus plane. Thus, the moving direction of the focus lens is reversed to match the image surface to the in-focus plane.

As described above, since the contrast detection scheme AF involves movement of the lens toward the in-focus position while searches are made for the lens position where higher frequency components of the image obtained from the image signal are at maximum, image signals need to be acquired with the position of the focus lens being moved gradually. Thus, the lens driving requires repeated driving over a short distance. To reduce a time taken for achieving focus, the repeated driving and stop of the focus lens must be performed quickly.

When the aforementioned contrast detection scheme AF is used in a digital camera, it is necessary to perform driving of a focus adjusting lens by a small amount and AF operation a number of times to bring the focus adjusting lens near the in-focus point if an image-taking lens has a large focal length and an image on an image pickup device is significantly blurred, which presents a problem of a long time taken for the focusing operation.

In contrast, the phase difference detection scheme AF does not present such a problem since focus can be substantially achieved by one-time lens driving.

On the other hand, a digital camera has an image pickup device significantly smaller in size than a silver film and thus requires a higher resolution for AF detection corresponding the ratio of the sizes. The phase difference detection scheme AF, however, has a problem that this requirement cannot be satisfied due to the limitation on the size of the secondary imaging lens 508 shown in FIG. 12.

In view of such problems, a so-called hybrid scheme AF has been proposed in which the phase difference detection scheme is first used to perform focusing operation of a focus adjusting lens at low resolution and then the contrast detection scheme is used to perform fine adjustment of the focusing operation.

The vibrating type motor, however, is not sufficiently excellent in responsiveness upon actuation for performing the contrast detection scheme AF which requires quickly repeated driving and stop although the vibrating type motor has the characteristic of high responsiveness to some extent. A long time may be needed before focus is achieved in the contrast detection scheme AF.

In the vibrating type motor, the vibrating member is in strong frictional contact with the moving member, and the frictional contact is used to transfer a driving force. Thus, to move the moving member in a traveling vibration wave at the time of start of driving, a large force exceeding the static friction force during stop of the moving member is required, which causes insufficient responsiveness upon actuation.

To address this, proposals for improving the responsiveness upon actuation have been made in which the vibrating member of the vibrating type motor is provided with vibrating energy before the start of driving with a traveling vibration wave by causing the electro-mechanical energy conversion elements to produce a standing vibration wave and then a traveling vibration wave.

Among the proposals, Japanese Patent Application Laid-Open No. 8-80073 proposes a method of driving a vibrating type motor in a standing wave switched from traveling wave driving for a certain time period after an in-focus state is reached.

In the contrast detection scheme AF, however, the remaining driving amount cannot be calculated due to its characteristic that the in-focus position is searched for while the lens is driven little by little as described above, and thus the technique in the aforementioned proposal cannot be employed. In addition, the aforementioned proposal attempts, after completion of focus adjusting operation of a focus lens (after focusing is achieved), to improve startup characteristics of the next focus adjusting operation, and does not attempt to reduce a time taken for operation before focus is achieved.

SUMMARY OF THE INVENTION

It is an object of the present invention to provide a camera, a lens apparatus, and a camera system which allow a reduction in time taken for achieving focusing when the contrast detection scheme AF is performed by using a vibrating type motor.

To achieve the aforementioned object, a camera according to the present invention comprises:

an image-taking optical system which forms an optical image by luminous flux from a subject and includes a focus lens;

an image pickup device which photoelectrically converts the optical image formed by the image-taking optical system to an image signal and outputs the image signal;

a vibrating type motor which drives the focus lens, the vibrating type motor including a vibrating member, an electro-mechanical energy conversion element which excites vibration on the vibrating member, and a driven member driven by the vibration of the vibrating member; and a control circuit which controls the vibrating type motor to repeatedly drive and stop the focus lens, extracts higher frequency components from the image signal obtained from the image pickup device in each stopped state of the focus lens, and performs focus adjusting operation of moving the focus lens to an in-focus position in accordance with a focus adjustment state of the image-taking optical system determined on the basis of the higher frequency components.

The control circuit causes traveling wave vibration to be generated on the vibrating member of the vibrating type motor when the focus lens is driven and causes standing wave vibration to be generated on the vibrating member while the focus lens is stopped during the focus adjusting operation.

To achieve the aforementioned object, a lens apparatus according to the present invention has an image-taking optical system which forms an optical image by luminous flux from a subject and includes a focus lens, and a vibrating type motor which drives the focus lens, the vibrating type motor including a vibrating member, an electro-mechanical energy conversion element which excites vibration on the vibrating member, and a driven member driven by the vibration of the vibrating member, the lens apparatus is removably mounted on a camera having an image pickup device which photoelectrically converts the optical image to an image signal and outputs the image signal, the camera extracting higher frequency components from the image signal obtained from the image pickup device in each stopped state of the focus lens and outputting a command signal for performing focus adjusting operation in accordance with a determination result of a focus adjustment state of the image-taking optical system determined on the basis of the higher frequency components.

The lens apparatus comprises:

a communication circuit which transmits and receives a signal to and from the camera; and a control circuit which controls the vibrating type motor to repeatedly drive and stop the focus lens and performs focus adjusting operation of moving the focus lens to an in-focus position in response to the command signal received from the camera through the communication circuit.

The control circuit causes traveling wave vibration to be generated on the vibrating member of the vibrating type motor when the focus lens is driven and causes standing wave vibration to be generated on the vibrating member while the focus lens is stopped during the focus adjusting operation.

Further, to achieve the aforementioned object, a camera system according to the present invention includes a lens apparatus having an image-taking optical system which forms an optical image by luminous flux from a subject and includes a focus lens, and a vibrating type motor which drives the focus lens, the vibrating type motor including a vibrating member, an electro-mechanical energy conversion element which excites vibration on the vibrating member, and a driven member driven by the vibration of the vibrating member, and a camera on which the lens apparatus is removably mounted, the camera having an image pickup device which photoelectrically converts the optical image to an image signal and outputs the image signal, the camera extracting higher frequency components from the image signal obtained from the image pickup device in each stopped state of the focus lens and outputting a command signal for performing focus adjusting operation in accordance with a focus adjustment state of the image-taking optical system determined on the basis of the higher frequency components.

The camera system comprises:

a communication circuit which transmits and receives a signal between the lens apparatus and the camera; and a control circuit provided for the lens apparatus which controls the vibrating type motor to repeatedly drive and stop the focus lens and performs focus adjusting operation of moving the focus lens to an in-focus position in response to the command signal received from the camera through the communication circuit.

The control circuit causes traveling wave vibration to be generated on the vibrating member of the vibrating type motor when the focus lens is driven and causes standing wave vibration to be generated on the vibrating member while the focus lens is stopped during the focus adjusting operation.

Further, to achieve the aforementioned object, a camera according to the present invention comprises:

an image-taking optical system which forms an optical image by luminous flux from a subject and includes a focus lens;

a first focus detection unit which detects a focus adjustment state of the image-taking optical system in a phase difference detection scheme by using luminous flux from the image-taking optical system;

an image pickup device which photoelectrically converts the optical image formed by the image-taking optical system to an image signal and outputs the image signal;

a second focus detection unit which detects a focus adjustment state of the image-taking optical system in a contrast detection scheme based on the image signal from the image pickup device;

a vibrating type motor which drives the focus lens, the vibrating type motor including a vibrating member, an electro-mechanical energy conversion element which excites vibration on the vibrating member, and a driven member driven by the vibration of the vibrating member; and a control circuit which controls the vibrating type motor based on the detection results of the first and second focus detection units.

The control circuit performs first-stage driving control for generating traveling wave vibration on the vibrating member of the vibrating type motor based on the detection result of the first focus detection unit, then performs second-stage driving control for generating traveling wave vibration on the vibrating member based on the detection result of the second focus detection unit, and performs intermediate control for generating standing wave vibration on the vibrating member from after completion of the first-stage driving control until start of the second-stage driving control.

Furthermore, to achieve the aforementioned object, a lens apparatus according to the present invention has an image-taking optical system which forms an optical image by luminous flux from a subject and includes a focus lens, and a vibrating type motor which drives the focus lens, the vibrating type motor including a vibrating member, an electro-mechanical energy conversion element which excites vibration on the vibrating member, and a driven member driven by the vibration of the vibrating member, the lens apparatus is removably mounted on a camera, the camera having a first focus detection unit which detects a focus adjustment state of the image-taking optical system in a phase difference detection scheme by using luminous flux from the image-taking optical system, an image pickup device which photoelectrically converts the optical image formed by the image-taking optical system to an image signal and outputs the image signal, and a second focus detection unit which detects a focus adjustment state of the image-taking optical system in a contrast detection scheme based on the image signal from the image pickup device, and the camera outputting a command signal for performing focus adjusting operation based on signals from the first and second focus detection units.

The lens apparatus comprises:

a communication circuit which transmits and receives a signal to and from the camera; and a control circuit which controls the vibrating type motor in response to the command signal received from the camera through the communication circuit.

The control circuit performs first-stage driving control for generating traveling wave vibration on the vibrating member of the vibrating type motor based on the detection result of the first focus detection unit, then performs second-stage driving control for generating traveling wave vibration on the vibrating member based on the detection result of the second focus detection unit, and performs intermediate control for generating standing wave vibration on the vibrating member from after completion of the first-stage driving control until start of the second-stage driving control.

Furthermore, to achieve the aforementioned object, a camera system according to the present invention including a lens apparatus, the lens apparatus having an image-taking optical system which forms an optical image by luminous flux from a subject and includes a focus lens, and a vibrating type motor which drives the focus lens, the vibrating type motor including a vibrating member, an electro-mechanical energy conversion element which excites vibration on the vibrating member, and a driven member driven by the vibration of the vibrating member, and a camera having a first focus detection unit which detects a focus adjustment state of the image-taking optical system in a phase difference detection scheme by using luminous flux from the image-taking optical system, an image pickup device which photoelectrically converts the optical image formed by the image-taking optical system to an image signal and outputs the image signal, and a second focus detection unit which detects a focus adjustment state of the image-taking optical system in a contrast detection scheme based on the image signal from the image pickup device, and the camera outputting a command signal for performing focus adjusting operation based on signals from the first and second focus detection units.

The camera system comprises:

a communication circuit which transmits and receives a signal between the camera and the lens apparatus; and a control circuit provided for the lens apparatus which controls the vibrating type motor in response to the command signal received through the communication circuit.

The control circuit performs first-stage driving control for generating traveling wave vibration on the vibrating member of the vibrating type motor based on the detection result of the first focus detection unit, then performs second-stage driving control for generating traveling wave vibration on the vibrating member based on the detection result of the second focus detection unit, and performs intermediate control for generating standing wave vibration on the vibrating member from after completion of the first-stage driving control until start of the second-stage driving control.

A detailed configuration of the camera, lens apparatus and camera system of the invention, the above and other objects and features of the invention will be apparent from the embodiments, described below.

DESCRIPTION OF THE PREFERRED EMBODIMENTS

Hereinafter, preferred embodiments of the invention will be described in detail with reference to the drawings.

Figure 1:
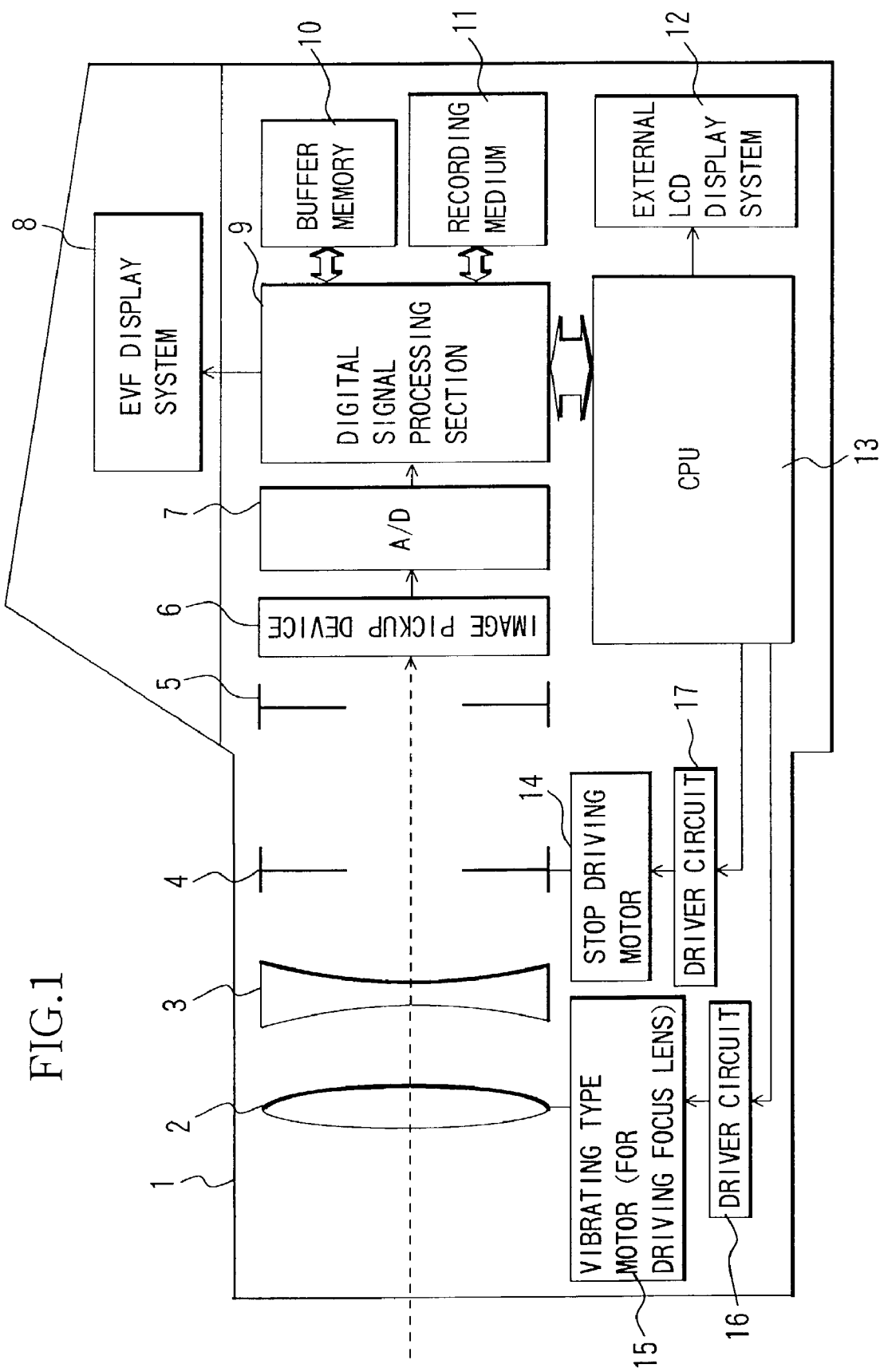
FIG. 1 is a block diagram showing the configuration of a digital camera of a type containing an image-taking lens which is an embodiment of the present invention.

FIG. 1 shows the configuration of a digital camera of a type containing an image-taking lens which is an embodiment of the present invention.

In FIG. 1, reference numeral 1 shows the digital camera (hereinafter simply referred to as a camera). In an image-taking system, reference numeral 2 shows a focus lens which performs focus adjustment, 3 a zoom lens which adjusts a magnification, 4 a stop which adjusts an amount of light, 6 an image pickup device such as a CCD and a CMOS which photoelectrically converts image light to an image signal for output, and 5 a shutter which adjusts an amount of light to the image pickup device 6.

Reference numeral 7 shows an A/D converter which digitizes an image signal from the image pickup device 6, 8 an electrical viewfinder system which displays an image picked up by the image pickup device 6, 9 a digital signal processing section which performs various digital signal processing of a digital image signal converted by the A/D converter 7, 10 a buffer memory used to temporarily store the digital image signal or the like, and 11 a recording medium such as a flash memory or other semiconductor memory, magnetic disk, optical disk, etc. which records taken digital data.

Reference numeral 12 shows an external LCD display system which displays various information such as an image-taking mode and the number of taken images, and 13 a camera CPU (control circuit) which performs control of the overall camera 1.

Reference numeral 14 shows a stop driving motor, 15 a vibrating type motor which drives the focus lens 2, 16 a driver circuit which drives the vibrating type motor 15, and 17 a driver circuit which drives the stop driving motor 14. The camera 1 has a power battery, not shown, mounted therein.

Figure 16:
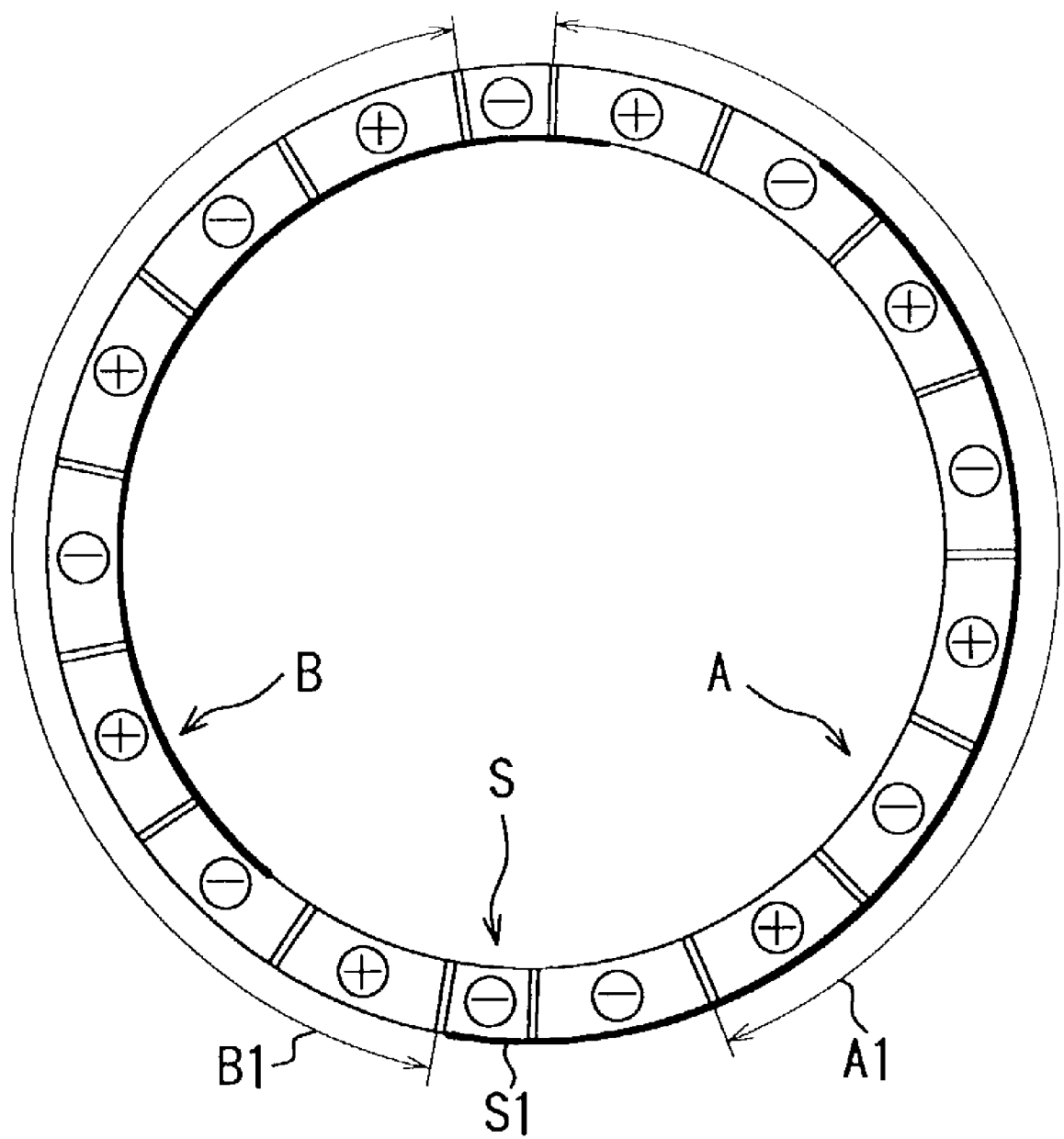
FIG. 16 shows the arrangement of electrodes and electrostrictive elements attached to a stator (vibrating member) of a vibrating type motor for use in the aforementioned respective embodiments.

The vibrating type motor 15 is now described with reference to FIG. 16. FIG. 16 shows the arrangement of electrostrictive elements disposed on a stator (vibrating member) formed of an elastic member such as material etc., in the vibrating type motor 15.

A and B in FIG. 16 show first and second electrostrictive element groups, respectively, disposed on the stator to have phases and polarization as shown. S indicates a sensor electrostrictive element disposed at a position shifted in phase 45 degrees to the first electrostrictive element group B. These electrostrictive elements may be realized by attaching separate ones on the stator or by polarizing an integral electrostrictive element.

In FIG. 16, A1, B1 show driving electrodes for the first and second electrostrictive element groups A, B, respectively. A cycle voltage is applied to the electrode A1 and a cycle voltage with a different phase with the cycle voltage applied to the electrode A1 is applied to the electrode B1 to form a traveling vibration wave on the surface of the stator.

S1 shows a sensor electrode for the sensor electrostrictive element S. When a vibration wave is formed on the surface of the stator, a cycle voltage is output from the sensor electrostrictive element S in accordance with the vibration state of the vibration wave. The cycle voltage is taken from the sensor electrode S1 to enable detection of the vibration state of the stator.

The vibrating type motor has a characteristic that a specific phase relationship is observed at resonance between the driving voltage to the driving electrode A1 and the output voltage from the sensor electrode S1. The relationship is determined by the positional relationship between the first electrostrictive element group A to which the cycle signal is applied through the driving electrode A1 and the sensor electrostrictive element S.

In the case of the embodiment, the resonance occurs when the signal waveforms to the electrode A1 and from the electrode S1 have a phase shift of 135 degrees in normal rotation, while the resonance occurs when the signal waveforms have a phase shift of 45 degrees in reverse rotation. The phase difference is larger as a deviation from the resonance is greater.

Figure 17:
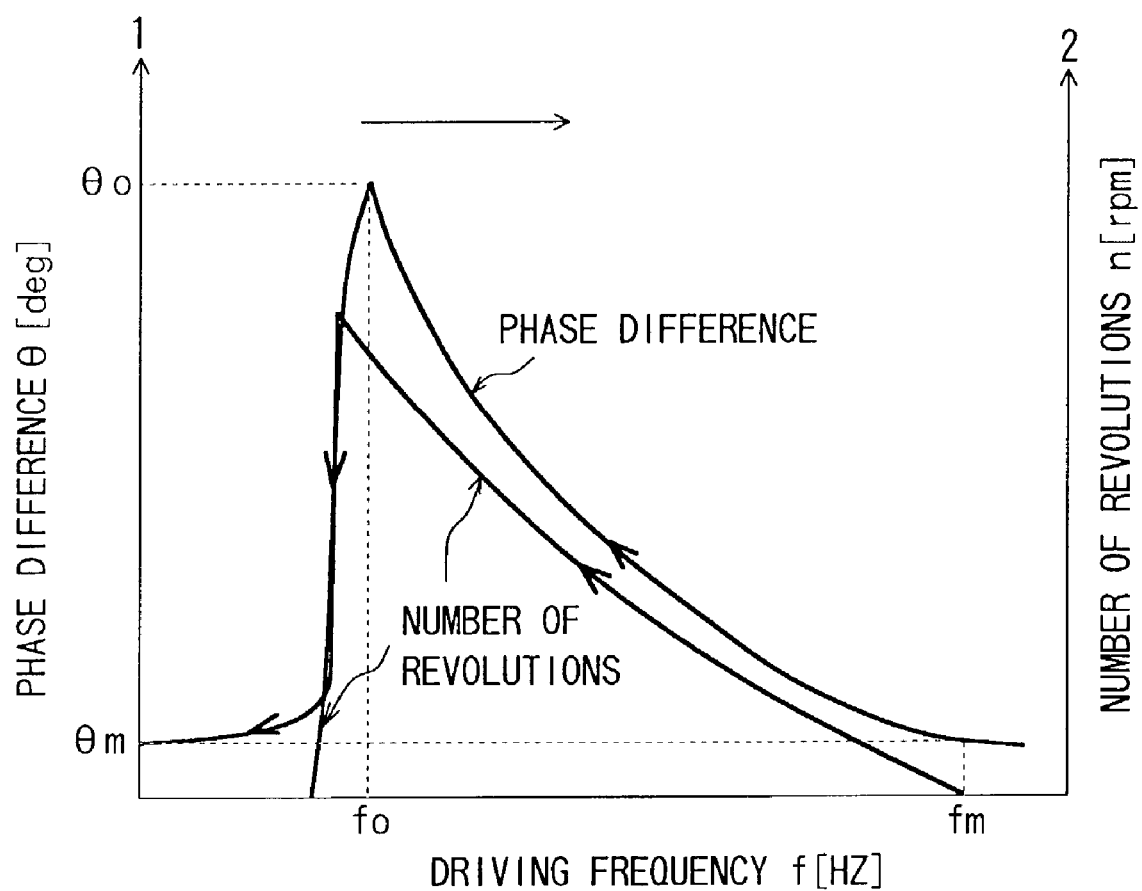
FIG. 17 is a plot showing the relationship among the frequency of a driving signal applied to the stator of the aforementioned vibrating type motor, a phase difference, and the number of revolutions.

FIG. 17 shows the phase characteristic between the phase A and phase S of the vibrating type motor, in which the horizontal axis represents a driving frequency f, a vertical axis 1 a phase difference θ between the phase A and phase S, and a vertical axis 2 the number of revolutions n.

In FIG. 17, the phase difference θ between the phase A and phase S is smaller toward the top, the number of revolutions n is higher toward the top, and the frequency f is higher toward the right.

The vibrating type motor has a higher number of revolutions n and a smaller phase difference θ between the phase A and phase S as the driving frequency f is scanned from high to low levels. However, as the driving frequency f is reduced past the resonance frequency f0, the number of revolutions is suddenly reduced and the phase difference θ is also changed quickly. The characteristic depends on temperature or load, and especially when load is increased, a shift occurs in a direction indicated by an arrow in FIG. 17 (in which the frequency is higher).

Figure 2:
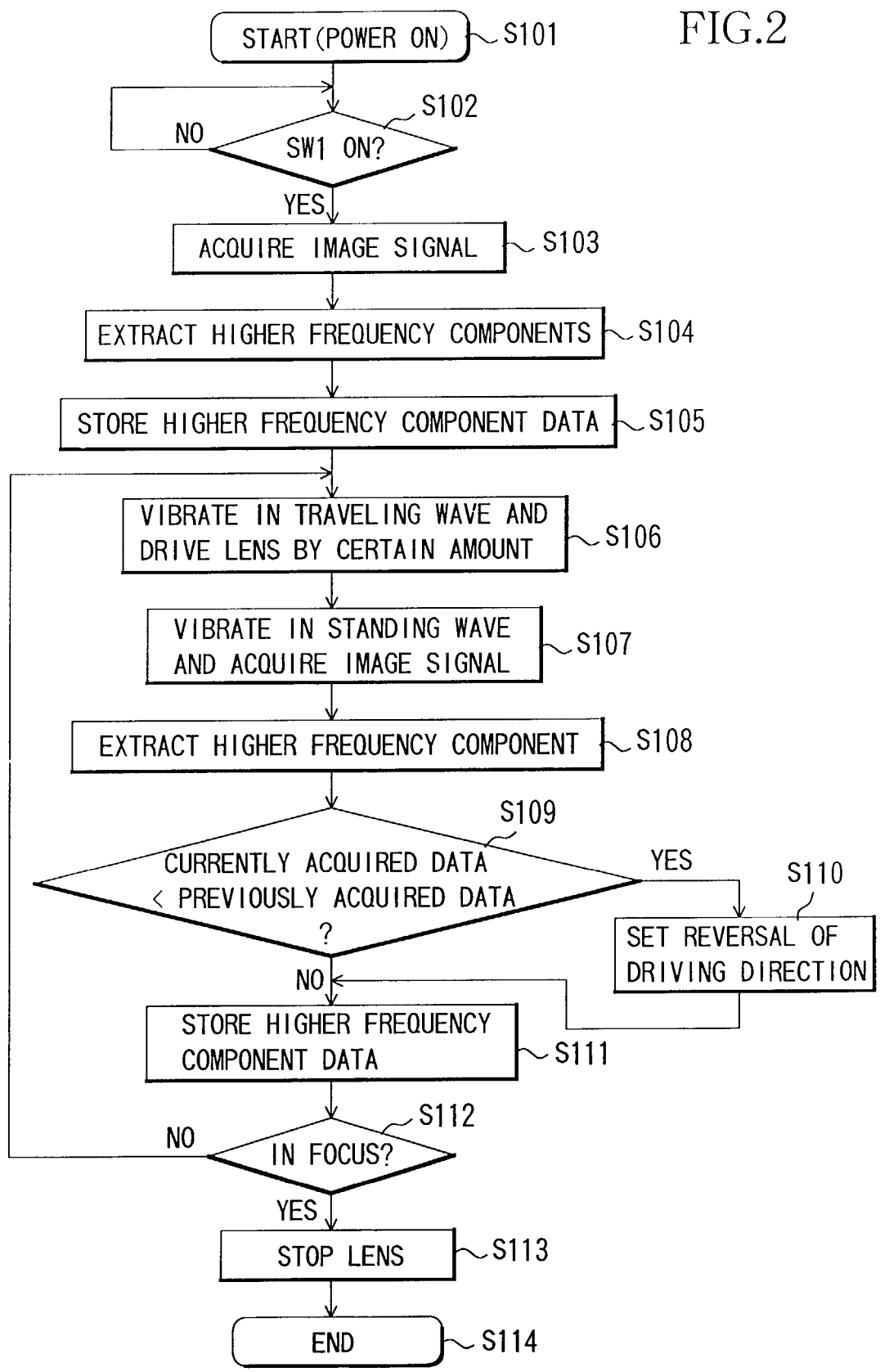
FIG. 2 is a flow chart showing an AF sequence in a contrast detection scheme in the camera of the embodiment shown in FIG. 1.

Next, description is made with reference to FIG. 2 for an operation sequence of the camera CPU 13 in the contrast detection scheme AF employed in the aforementioned camera 1. However, the sequence in FIG. 2 is an example of the contrast detection scheme AF, and another sequence may be performed in the contrast detection scheme AF for driving the vibrating type motor to generate a standing wave.

[Step 101]

The sequence is started in response to turn-on of a main switch, not shown, of the camera 1.

[Step 102]

The camera CPU 13 determines whether or not a release button, not shown, provided for the camera 1 is half-pressed to make a SW1 ON. If the SW1 is ON, the sequence proceeds to step 103. If the SW is OFF, a standby state is entered.

[Step 103]

In response to the turn-on of the SW1, an image signal output from the image pickup device 6 is acquired.

[Step 104]

Higher frequency components are extracted from the image signal acquired at step 103.

[Step 105]

The data on the higher frequency components extracted at step S104 is temporarily stored in the memory buffer 10.

[Step 106]

The focus lens 2 is driven by a certain amount. While the driving amount is always constant (for example, a minute driving amount) in the embodiment, the driving amount may be changed in accordance with the newest value of the higher frequency component data. For example, when the value of the higher frequency component data is small, the focus lens 2 is considered as being at some distance from an in-focus position and the driving amount is increased, and when the value of the higher frequency component data is large, the focus lens 2 is considered as being near the in-focus position and the driving amount is reduced.

The driving of the focus lens 2 is now described. When the sequence proceeds to step S106 from step S105, the vibrating type motor is at a complete standstill (the stator is non-vibrating). Thus, high frequency driving signals (cycle signals for the phases A and B) are applied to the electrostrictive elements of the vibrating type motor 15 to cause the stator to generate traveling wave vibration, and the vibrating type motor 15 is actuated and driven by the certain amount with the frequency being gradually reduced. In this event, the phase difference between the phase A and phase S described above is read to perform control such that the driving frequency does not fall below the resonance frequency f0.

As a target position after driving by the certain amount is approached, the frequency of the driving signals for the phases A, B is increased to decelerate the driving of the vibrating type motor 15. After the driving by the certain amount, the driving signals for the phases A, B to the vibrating type motor 15 are switched from a phase difference for generating traveling wave vibration to a phase difference for generating standing wave vibration to stop (temporarily stop) the focus lens 2 (step 107). The driving frequency when the traveling wave vibration is switched to the standing wave vibration is a startup frequency (the aforementioned high frequency) used for starting to actuate the vibrating type motor 15 by the traveling wave vibration.

When the sequence proceeds to step S106 from step S112, the stator of the vibrating type motor 15 is vibrating in a standing wave and the vibrating type motor 15 is not driven. The driving signals for the phases A, B are switched from the phase difference for generating standing wave vibration to the phase difference for generating traveling wave vibration to drive the vibrating type motor 15 by the certain amount. In this event, the phase difference between the phase A and phase S described above is also read to perform control such that the driving frequency does not fall below the resonance frequency f0. After the driving by the certain amount, the driving signals for the phases A, B are switched from the phase difference for generating traveling wave vibration to the phase difference for generating standing wave vibration to stop the focus lens 2 (step 107).

The traveling wave vibration of the stator is generated by applying driving signals for the phases A, B having a phase difference of 90 degrees to the electrode A1 and the electrode B1 shown in FIG. 16. The driving direction may be switched by advancing or delaying the phase of the signal applied to the electrode B1 with respect to the signal applied to the electrode A1.

The standing wave vibration of the stator can be generated by applying a driving signal to one of the electrode A1 and the electrode B1 or applying driving signals with the same phases to the electrodes A1, B1. Driving signals with a phase difference of 180 degrees may be applied to the electrodes A1, B1. The driving frequency in the standing wave vibration is the startup frequency (the aforementioned high frequency) used for actuating the vibrating type motor 15 by the traveling wave vibration.

[Step 107]

After the focus lens 2 is driven by the certain amount in this manner, an image signal output from the image pickup device 6 is again acquired while the vibrating type motor 15 is in the standing wave driving state.

[Step 108]

Higher frequency components are extracted from the image signal acquired at step 107.

[Step 109]

The previously extracted higher frequency component data is compared with the higher frequency component data extracted this time at step 108.

If the previously extracted data shows a larger value, the driving direction at step 106 is considered as opposite to the in-focus position and the sequence proceeds to step 110, or otherwise, the driving direction at step 106 is considered as leading to the in-focus position and the sequence proceeds to step 111.

[Step 110]

Since the in-focus position is opposite to the driving direction, the camera CPU 13 makes setting to reverse the direction in the next driving of the focus lens 2.

[Step 111]

Since the driving direction leads to the in-focus position, the higher frequency component data extracted at step 108 is temporarily stored in the buffer memory 10.

[Step 112]

Whether or not focusing (in-focus state) is achieved is determined from the value of the higher frequency component data stored in the memory buffer 10, the condition whether or not the focus lens 2 is reversely driven near the current position of the focus lens 2, and the like. If it is determined that focusing is achieved, the sequence proceeds to step 113. If it is determined that focusing is not achieved, the sequence returns to step 106 at which the focus lens 2 is again driven by the certain amount and then driven in the standing wave (temporarily stopped), and an image signal is again acquired.

In this manner, the vibrating type motor 15 (focus lens 2) is repeatedly driven and stopped until it is determined that focusing is achieved, in other words, until the focus lens 2 is moved to a position where the higher frequency component data reaches a maximum value.

[Step 113]

If it is determined that focusing is achieved at step 112, the vibrating type motor 15 or the focus lens 2 is stopped. In this event, the vibrating type motor 15, which has generated the standing wave vibration, is made non-vibrating and completely stopped by stopping the application of the driving signal.

This is performed for the following reason. Since the moving member (driven member, for example rotor) is in a kind of floating state to the stator while the vibrating type motor 15 generates the standing wave vibration, and the focus lens 2 is readily moved by a small external force, the vibrating type motor 15 is made non-vibrating and completely stopped to hold the in-focus position. The stop of the application of the driving signal to the vibrating type motor 15 also has the effect of power savings. Then, the sequence is ended (step 114).

In the embodiment, the vibrating type motor 15 is caused to vibrate in the standing wave each time the focus lens 2 is temporarily stopped after driving by the certain amount during the focusing operation until focusing is achieved in the operation of the contrast detection scheme AF. Alternatively, it is possible that a time period until the focus lens 2 is moved to within a predetermined range (near the in-focus position) including the in-focus position is set as a first mode, a time period until the focus lens 2 is moved to the in-focus position in that predetermined range is set as a second mode, and the vibrating type motor 15 is caused to generate the standing wave vibration and not to be driven only at the time of temporary stop when the lens is repeatedly driven by a small amount in the second mode.

Figure 3:
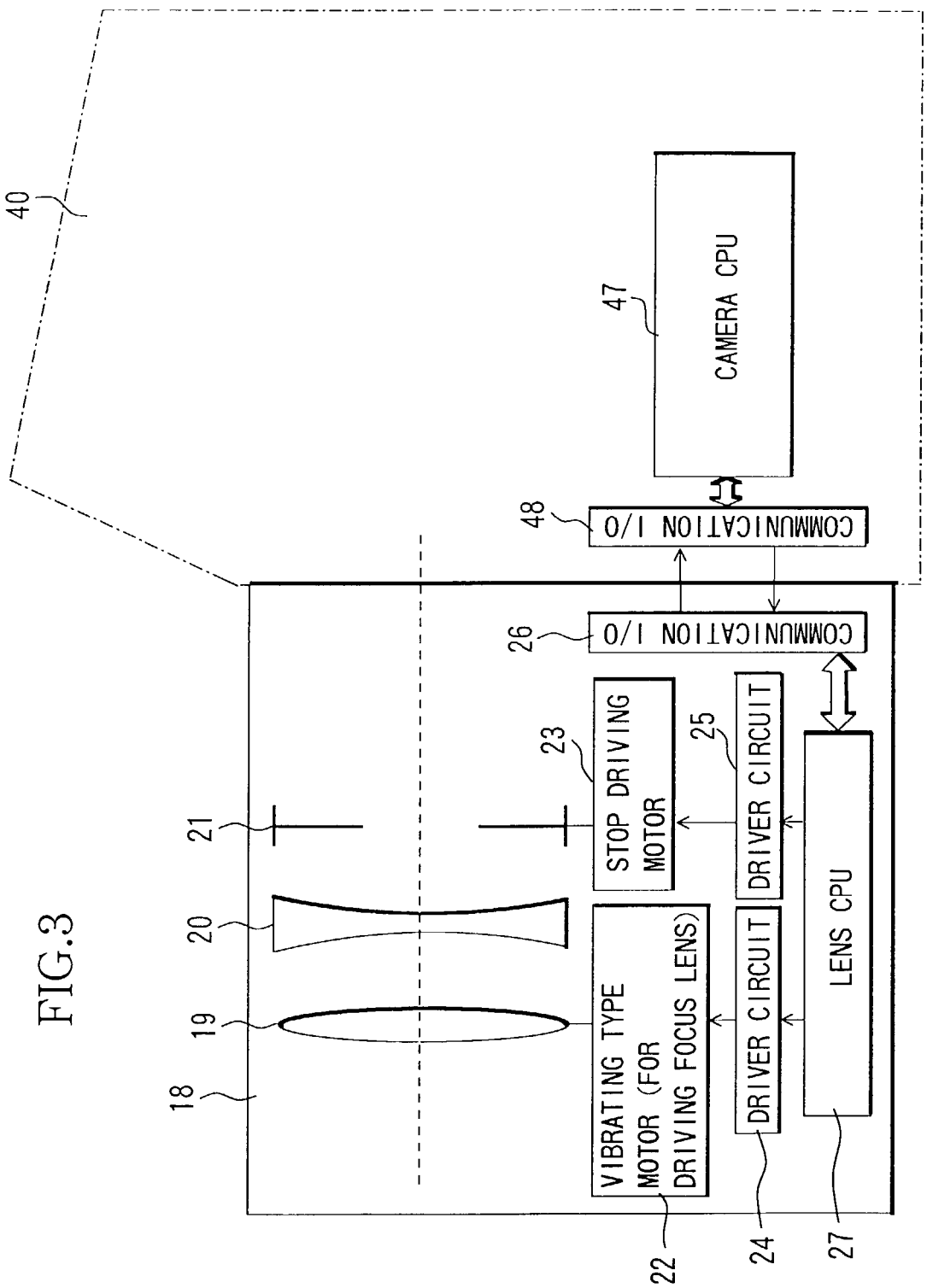
FIG. 3 is a block diagram showing the configuration of an interchangeable lens apparatus which is another embodiment of the present invention.

FIG. 3 shows the configuration of an interchangeable lens apparatus which is another embodiment of the present invention. In FIG. 3, reference numeral 18 shows the interchangeable lens apparatus, and reference numeral 40 shows a camera on which the interchangeable lens apparatus 18 is removably mounted (hereinafter simply referred to as a camera). The camera 40 may support the contrast detection scheme AF or AF in a scheme other than the contrast detection scheme (for example, the phase difference detection scheme).

In an image-taking optical system in the interchangeable lens apparatus 18, reference numeral 19 shows a focus lens which performs focus adjustment, 20 a zoom lens which adjusts a magnification, and 21 a stop which adjusts an amount of light.

Reference numeral 23 shows a stop driving motor, 22 a vibrating type motor which drives the focus lens 19, 24 a driver circuit which drives the vibrating type motor 22, and 25 a driver circuit which drives the stop driving motor 22. Reference numeral 27 shows a lens CPU (control circuit) which controls the lens apparatus 18, and 26 a communication interface which allows communication between the lens CPU 27 and a camera CPU 47, later described.

The camera 40 is provided with an image pickup device or a silver film, not shown, and a shutter which adjusts an amount of light to the image pickup device or film. The camera CPU 47 controls the overall camera. Reference numeral 48 shows a communication interface which allows communication between the camera CPU 47 and the lens CPU 27. The camera 40 has a power battery, not shown, mounted therein, and the lens apparatus 18 is supplied with power from the camera 40.

Figure 4:
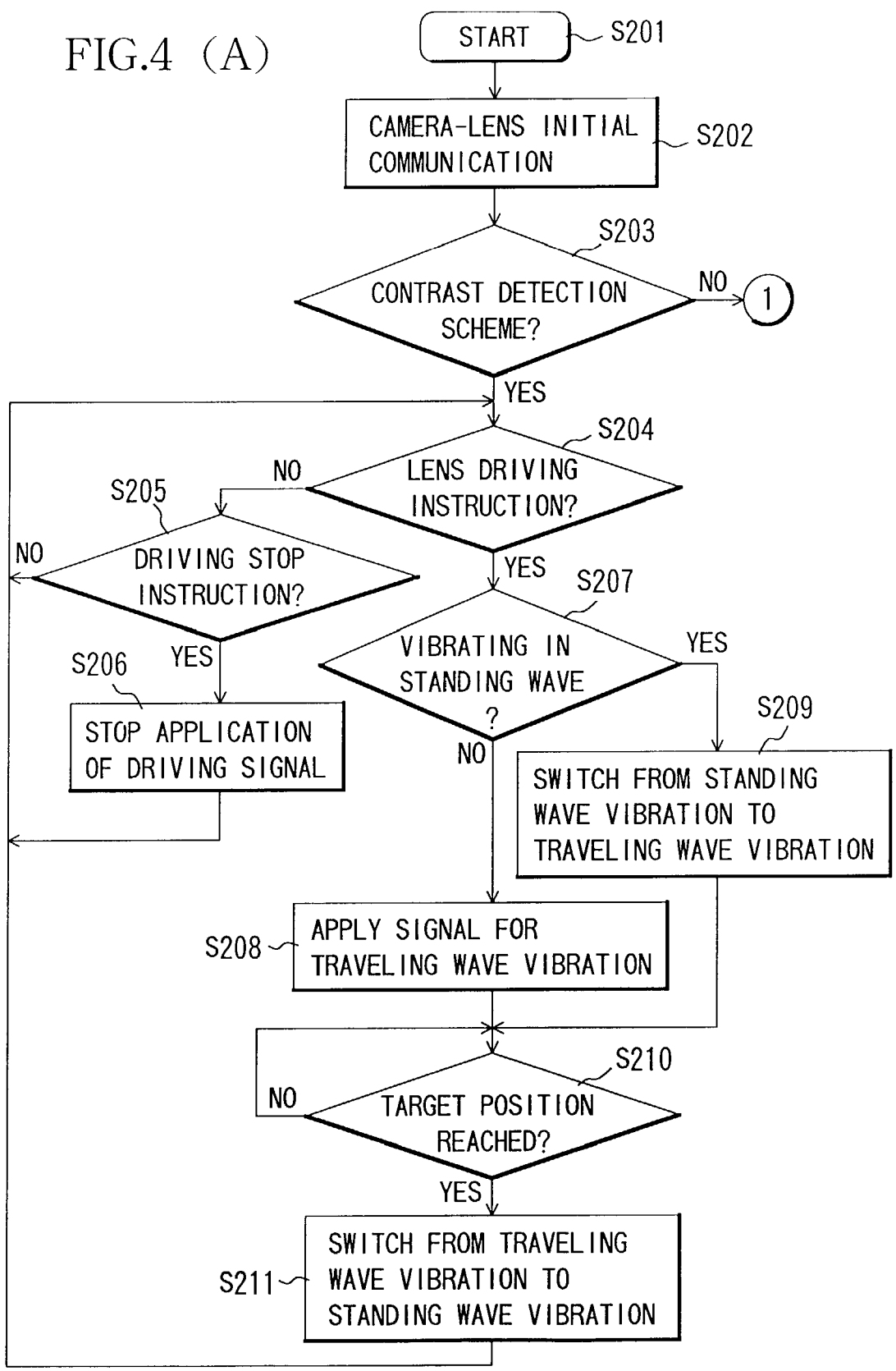
FIGS. 4(A) and (B) show a flow chart showing an AF sequence in the interchangeable lens apparatus of the embodiment shown in FIG. 3.
Figure 4:
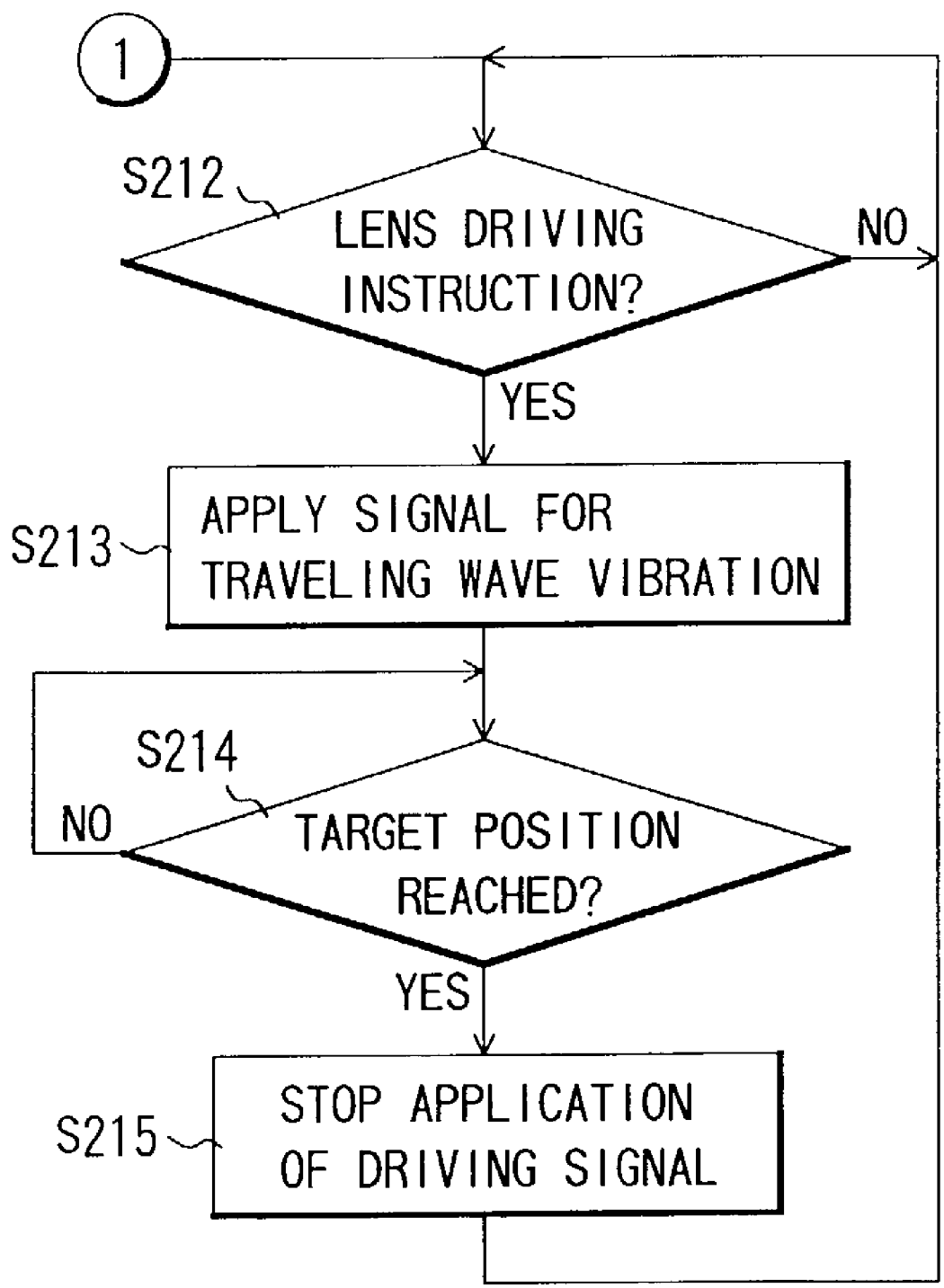

In the embodiment, the camera CPU 47 transmits a command for driving the focus lens 19 to the lens CPU 27 which controls the vibrating type motor 22 in accordance with the AF scheme employed in the camera 40. The processing of the lens CPU 27 is hereinafter described by using FIG. 4(A) and FIG. 4(B). Lines added circled 1 in FIG. 4(A) and FIG. 4(B) are connected to each other.

[Step 201]

The sequence is started when the lens apparatus 18 is mounted on the camera 40.

[Step 202]

The lens CPU 27 performs initial communication with the camera CPU 47 through the communication interfaces 26, 48.

[Step 203]

The lens CPU 27 determines whether or not the camera 40 support the contrast detection scheme AF from the initial communication performed at step 202. Specifically, information transmitted from the camera during the initial communication includes information for identifying the AF scheme, and the AF scheme is identified from that information. The sequence proceeds to step 204 if the information indicates the contrast detection scheme, or to step 212 if the information indicates a scheme other than the contrast detection scheme (for example, the phase difference detection scheme).

[Step 204]

Since the AF scheme supported by the camera 40 is the contrast detection scheme, a standing wave driving mode is established in which the vibrating type motor 22 is caused to vibrate in a standing wave at the time of stop during focus operation. The operation in the standing wave driving mode is described up to step 211.

First, it is determined whether or not the content of the communication transmitted from the camera is a focus lens driving instruction (command signal), and the sequence proceeds to step 207 if it is the focus lens driving instruction, or to step 205 if not.

[Step 205]

It is determined whether or not the content of the communication transmitted from the camera is a driving stop instruction for the focus lens 19 (end command), and the sequence proceeds to step 206 if it is the driving stop instruction, or returns to step 204 and the lens CPU 27 waits for communication if not.

[Step 206]

Since the content of the communication is determined to be the driving stop instruction at step 205, the application of a driving signal to the vibrating type motor 22 is stopped, and the vibrating type motor 22 is made non-vibrating and completely stopped. The driving stop instruction is transmitted when it is determined that focusing (in-focus state) is achieved in the camera 40 or when transition is made to a low power consumption mode.

[Step 207]

The lens CPU 27, upon reception of the focus lens driving instruction, determines whether or not the vibrating type motor 22 is vibrating in a standing wave. The sequence proceeds to step 209 if it is vibrating in a standing wave, or to step 208 if it is non-vibrating with no standing wave vibration (at a complete standstill).

[Step 208]

Since the vibrating type motor 22 is now non-vibrating, higher frequency driving signals (cycle signals for the phases A, B) are applied to electrostrictive elements of the vibrating type motor 22 to cause a stator to generate traveling wave vibration, and the vibrating type motor 22 is actuated with the frequency being reduced gradually to drive the focus lens 19 toward a target position corresponding to a position after driving by a certain amount included in the focus lens driving instruction. At this point, the phase difference between the phase A and phase S is read to perform control such that the driving frequency does not fall below the resonance frequency f0.

[Step 209]

Since the vibrating type motor 22 is now vibrating in a standing wave, driving signals for the phases A, B to the vibrating type motor 22 are switched from the phase difference for generating standing wave vibration to the phase difference for generating traveling wave vibration to actuate the vibrating type motor 22, and the focus lens 19 is driven toward the aforementioned target position.

[Step 210]

It is determined whether or not the focus lens 19 reaches the target position (whether or not it is driven by the certain amount), and if the target position is reached, the sequence proceeds to step 211. If the target position is not reached, the vibrating type motor 22 is driven until the target position is reached.

In this event, it is preferable that control is performed such that the driving amount remaining before the target position is reached is monitored and deceleration processing is performed at the time when the remaining driving amount becomes equal to or lower than a certain level to avoid overrun and prevent a user from feeling shock at the time of stop.

[Step 211]

Since the focus lens 19 reaches the target position (it is driven by the certain amount), the driving signals for the phases A, B to the vibrating type motor 22 are switched from the phase difference for generating traveling wave vibration to the phase difference for generating standing wave vibration to stop (temporarily stop) the vibrating type motor 22 and the focus lens 19. The driving frequency when the traveling wave vibration is switched to the standing wave vibration is a startup frequency (the aforementioned high frequency) used for starting to actuate the vibrating type motor 22 by the traveling wave vibration.

Then, the sequence returns to step 204 and the next driving instruction transmitted from the camera 40 is waited for. During the wait, the vibrating type motor 22 is vibrating in a standing wave. The camera CPU 47 extracts higher frequency components in an image signal output from an image pickup device (not shown) provided for taking images or detecting focus in the camera 40, detects the focus adjustment state of the image-taking optical system, and determines whether or not focusing is achieved.

Upon reception of the next driving instruction from the camera 40, the lens CPU 27 switches the driving signals for the phases A, B to the vibrating type motor 22 to the phase difference for generating traveling wave vibration in order to perform the next driving of the focus lens 19.

In this manner, the focus lens 19 is repeatedly driven and stopped each time a driving instruction is received from the camera 40, while it is determined whether or not higher frequency components show the maximum value based on comparisons of higher frequency component data extracted from image signals output from the image pickup device of the camera 40 in the respective stopped states of the focus lens 19 until focusing is finally achieved.

Next, description is made for a normal driving mode when the camera 40 supports an AF scheme other than the contrast detection scheme (for example, a phase difference detection scheme).

[Step 212]

It is determined whether or not the content of communication transmitted from the camera 40 is a focus lens driving instruction, and the sequence proceeds to step 213 if it is the focus lens driving instruction, or the lens CPU 27 waits for communication from the camera if not.

[Step 213]

Since the vibrating type motor 22 is at a complete standstill, high frequency driving signals (cycle signals for the phases A, B) are applied to the electrostrictive elements of the vibrating type motor 22 to cause the stator to generate traveling wave vibration, and the vibrating type motor 22 is actuated with the frequency being reduced gradually to drive the focus lens 19 toward a target position calculated or the like based on the AF scheme in the camera 40. At this point, the phase difference between the phase A and phase S described earlier is read to perform control such that the driving frequency does not fall below the resonance frequency f0.

[Step 214]

It is determined whether or not the focus lens 19 reaches the target position, and if the target position is reached, the sequence proceeds to step 215. If the target position is not reached, the vibrating type motor 22 is driven until the target position is reached. In this event, it is preferable that control is performed such that the driving amount remaining before the target position is reached is monitored and deceleration processing is performed at the time when the remaining driving amount becomes equal to or lower than a certain level to avoid overrun and prevent a user from feeling shock at the time of stop.

[Step 215]

When the focus lens 19 reaches the target position, the application of the driving signal to the vibrating type motor 22 is stopped to make the vibrating type motor 22 non-vibrating, thereby completely stopping the vibrating type motor 22 and the focus lens 19.

As described above, since the lens apparatus 18 of the embodiment may be used to switch the driving method of the vibrating type motor in accordance with the AF scheme of the camera on which the lens is mounted, the lens apparatus of the embodiment can be used both in a camera for AF in the contrast detection scheme and in a camera for AF in a scheme other than the contrast detection scheme. Fast and comfortable AF operation can be performed when the lens apparatus is mounted on either camera.

Figure 5:
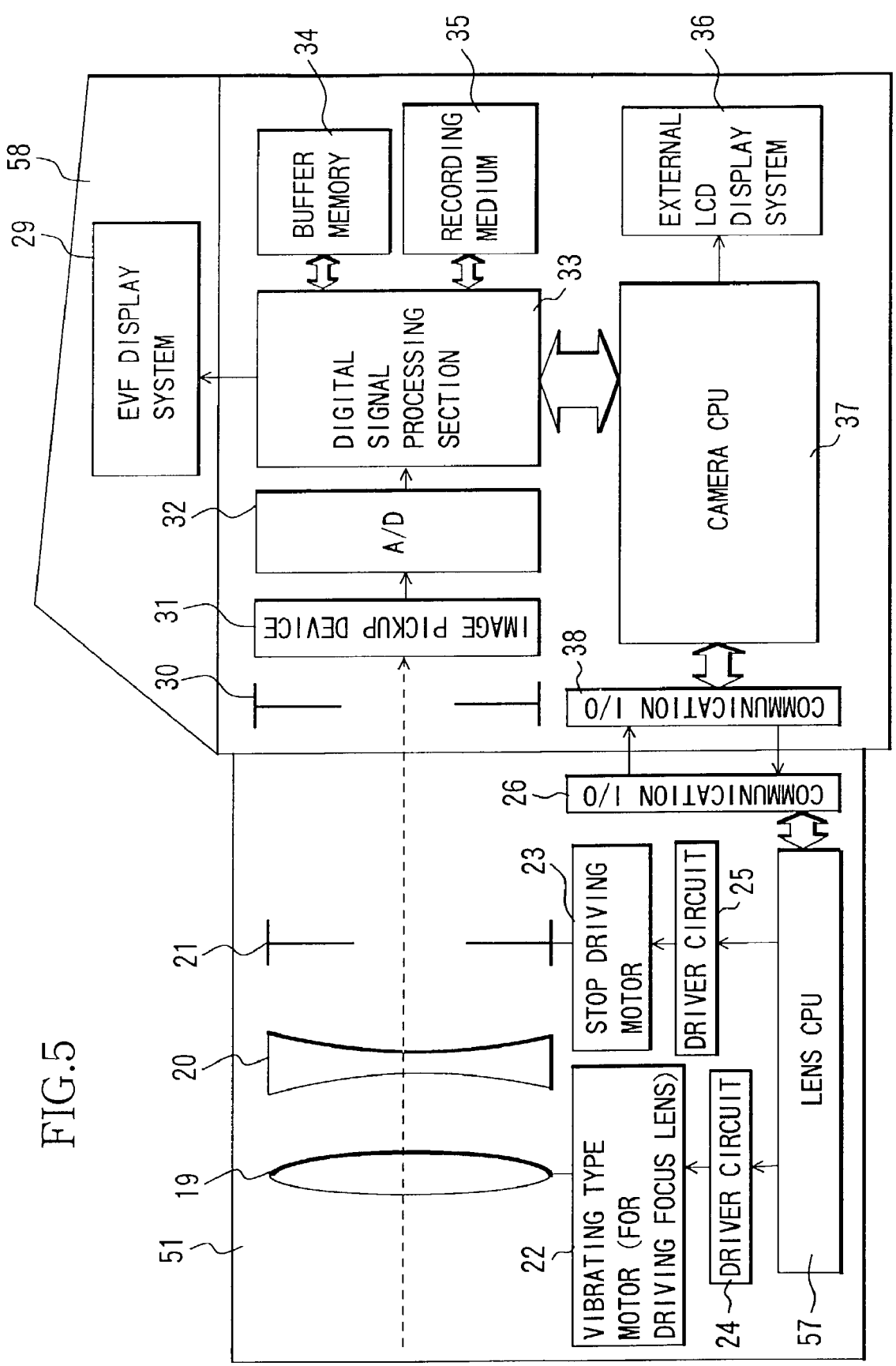
FIG. 5 is a block diagram showing the configuration of a digital camera system which is another embodiment of the present invention.

FIG. 5 shows the configuration of a camera system which is another embodiment of the present invention and comprises a digital camera and an interchangeable lens apparatus. In the embodiment, components identical to those in the previous embodiment are designated with the same reference numerals as those in the previous embodiment.

In FIG. 5, reference numeral 51 shows the interchangeable lens apparatus and reference numeral 58 shows the digital camera (hereinafter simply referred to as a camera) on which the lens apparatus 51 is removably mounted.

In an image-taking optical system in the interchangeable lens apparatus 51, reference numeral 19 shows a focus lens which performs focusing, 20 a zoom lens which adjusts a magnification, and 21 a stop which adjusts an amount of light.

Reference numeral 23 shows a stop driving motor, 22 a vibrating type motor which drives the focus lens 19, 24 a driver circuit which drives the vibrating type motor 22, and 25 a driver circuit which drives the stop driving motor 22.

Reference numeral 57 shows a lens CPU (control circuit) which controls the lens apparatus 51, and reference numeral 26 shows a communication interface which allows communication between the lens CPU 57 and a camera CPU 37, later described.

In the camera 58, reference numeral 31 shows an image pickup device such as a CCD and a CMOS which photo-electrically converts image light to an image signal for output, and reference number 30 shows a shutter which adjusts an amount of light to the image pickup device 31.

Reference numeral 32 shows an A/D converter which digitizes an image signal from the image pickup device 31, 29 an electrical viewfinder system which displays an image picked up by the image pickup device 31, 33 a digital signal processing section which performs various digital signal processing of a digital image signal converted by the A/D converter 32, 34 a buffer memory used to temporarily store the digital image signal or the like, and 35 a recording medium such as a flash memory or other semiconductor memory, magnetic disk, optical disk, etc. which records taken digital data.

Reference numeral 36 shows an external LCD display system which displays various information such as an image-taking mode and the number of taken images, and 37 the camera CPU which performs control of the overall camera 58. Reference numeral 38 shows a communication interface which allows communication between the camera CPU 37 and the lens CPU 57. The camera 58 has a power battery, not shown, mounted therein. The lens apparatus 51 is supplied with power from the camera 58.

Figure 6:
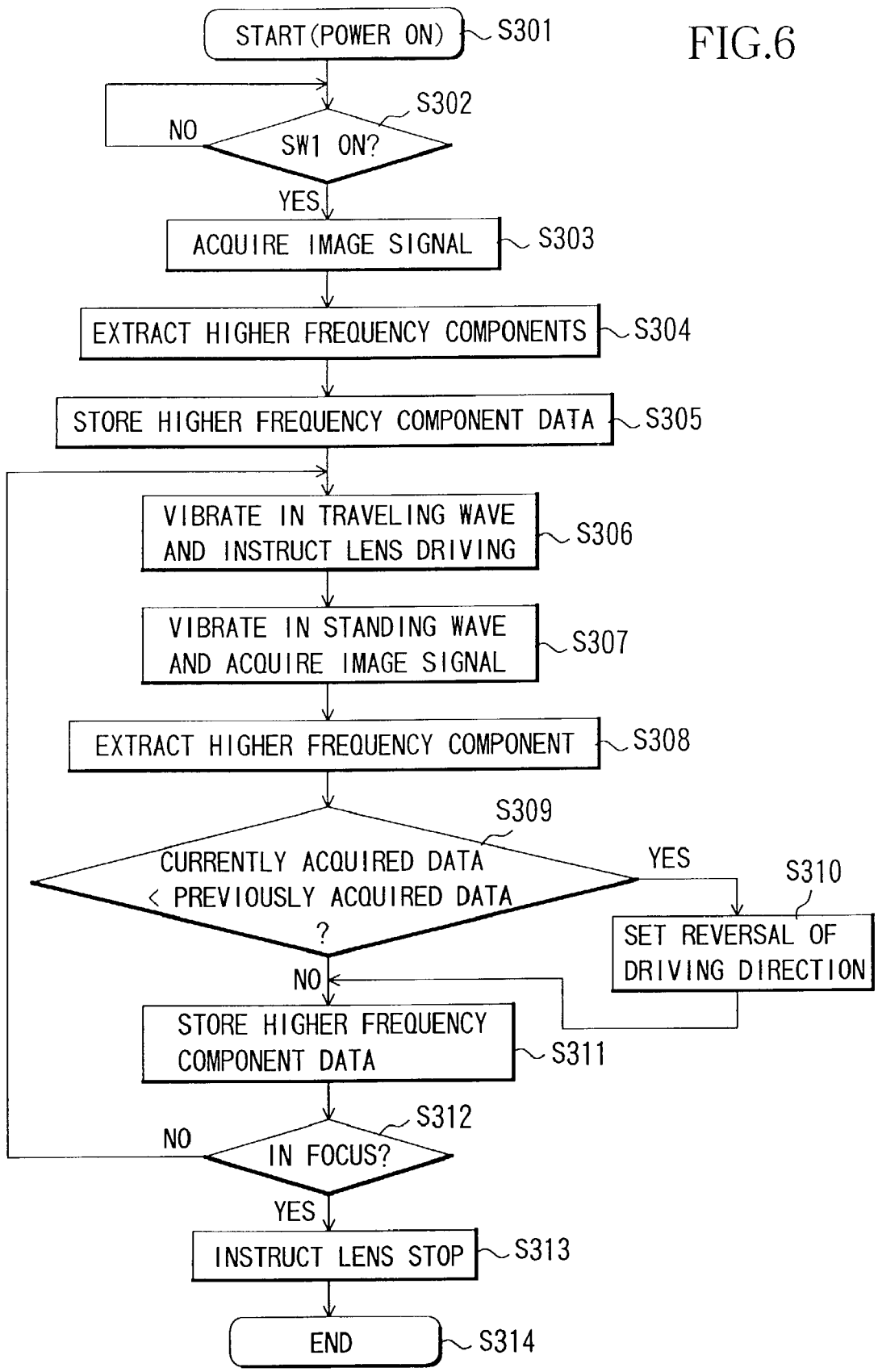
FIG. 6 is a flow chart showing an AF sequence in the contrast detection scheme of a camera forming part of the camera system of the embodiment shown in FIG. 5.
Figure 7:
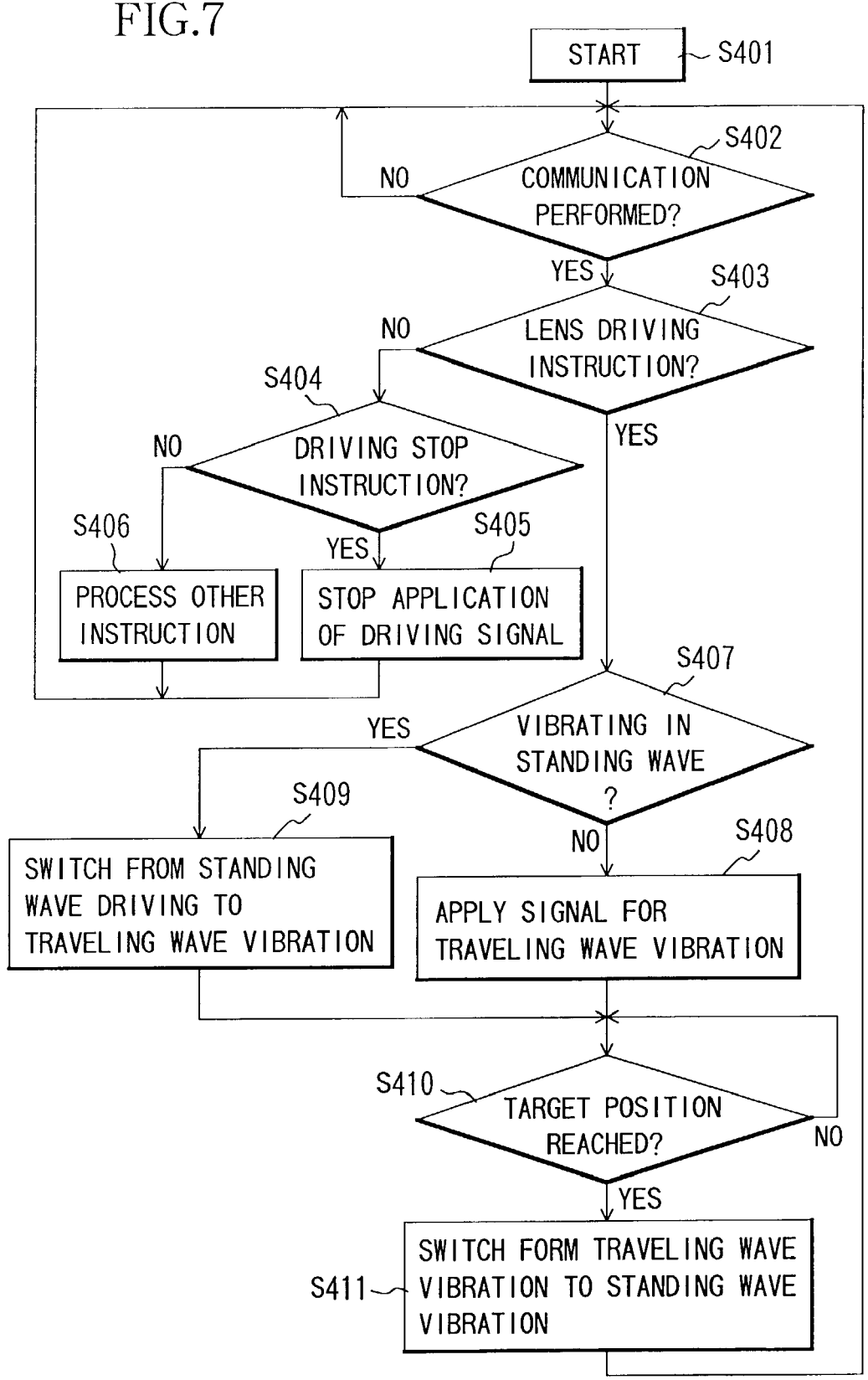
FIG. 7 is a flow chart showing an AF sequence in the contrast detection scheme of an interchangeable lens apparatus forming part of the camera system of the embodiment shown in FIG. 5.

Next, description is made for an operation sequence of the camera CPU 37 and the lens CPU 57 in the contrast detection scheme AF employed in the aforementioned camera system with reference FIGS. 6 and 7. However, the sequence in FIGS. 6 and 7 is an example of the contrast detection scheme AF, and another sequence may be performed in the contrast detection, scheme AF for driving the vibrating type motor to generate a standing wave.

The operation of the camera CPU 37 is described with reference to FIG. 6.

[Step 301]

The sequence is started in response to turn-on of a main switch, not shown, of the camera 58.

[Step 302]

The camera CPU 37 determines whether a release button, not shown, provided for the camera 58 is half-pressed to make a SW1 on. When the SW1 is ON, the sequence proceeds to step 303. When the SW1 is OFF, a standby state is entered.

[Step 303]

In response to the turn-on of the SW 1, an image signal output from the image pickup device 31 is acquired.

[Step 304]

Higher frequency components are extracted from the image signal acquired at step 303.

[Step 305]

The data on the higher frequency components extracted at step S304 is temporarily stored in the memory buffer 34.

[Step 306]

A focus driving instruction (command signal) is transmitted to the lens apparatus 51 to drive the focus lens 19 by a certain amount. While the driving amount is always constant (for example, a minute driving amount) in the embodiment, the driving amount may be changed in accordance with the newest value of the higher frequency component data. For example, when the value of the higher frequency component data is small, the focus lens 19 is considered as being at some distance from an in-focus position and the driving amount is increased, and when the value of the higher frequency component data is large, the focus lens 19 is considered as being near the in-focus position and the driving amount is reduced.

[Step 307]

After the focus lens 19 is driven by the certain amount in the lens apparatus 51, an image signal output from the image pickup device 31 is again acquired.

[Step 308]

Higher frequency components are extracted from the image signal acquired at step 307.

[Step 309]

The previously extracted higher frequency component data is compared with the higher frequency component data extracted this time at step 308. If the previously extracted data shows a larger value, the driving direction at step 306 is opposite to the in-focus position and the sequence proceeds to step 310, or otherwise, the driving direction at step 306 is considered as leading to the in-focus position and the sequence proceeds to step 311.

[Step 310]

Since the in-focus position is opposite to the driving direction, the camera CPU 37 makes setting to reverse the direction in the next driving of the focus lens 19.

[Step 311]

Since the driving direction leads to the in-focus position, the higher frequency component data extracted at step 308 is temporarily stored in the buffer memory 34.

[Step 312]

Whether or not focusing (in-focus state) is achieved is determined from the value of the higher frequency component data stored in the memory buffer 34, the condition whether the focus lens 19 is reversely driven near the current position of the focus lens 19, and the like.

When it is determined that focusing is achieved, the sequence proceeds to step 313, and when it is determined that focusing is not achieved, the sequence returns to step 306 at which a driving instruction of the focus lens 19 by a certain amount is again transmitted and an image signal is again acquired.

In this manner, the vibrating type motor 22 (focus lens 19) is repeatedly driven and stopped until it is determined that focusing is achieved, in other words, until the focus lens 19 is moved to a position where the higher frequency component data reaches a maximum value.

[Step 313]

When it is determined that focusing is achieved at step 312, a driving stop instruction (end command) is transmitted to the lens apparatus 51 to completely stop the vibrating type motor 22 and the focus lens 19. Then, the sequence is ended (step 314).

Subsequently, the operation of the lens CPU 57 is described with reference to FIG. 7.

[Step 401]

The lens apparatus 51 is mounted on the camera 58 and power is provided from the camera 58 to start this operation sequence.

[Step 402]

The lens CPU 57 determines whether or not communication is made from the camera, and the sequence proceeds to step 403 if communication is made, or the lens CPU 57 enters a wait state for communication if not.

[Step 403]

It is determined whether or not the content of the communication transmitted from the camera 58 is a focus lens driving instruction (command signal). The sequence proceeds to step 407 if it is the focus lens driving instruction, or to step 404 if it is another instruction.

[Step 404]

It is determined whether or not the content of the communication transmitted from the camera 58 is a driving stop instruction of the focus lens 19 (end command). The sequence proceeds to step 405 if it is the driving stop instruction, or to step 406 if it is another instruction.

[Step 405]

Since the content of the communication is determined to be the driving stop instruction at step 403, the application of a driving signal to the vibrating type motor 22 is stopped, and the vibrating type motor 22 is made non-vibrating and completely stopped.

The driving stop instruction is transmitted when it is determined that focus is achieved in the camera 58 or when transition is made to a low power consumption mode.

It should be noted that the vibrating type motor 22 is made non-vibrating and completely stopped by stopping the application of the driving signal even when the vibrating type motor 22 is vibrating in a standing wave.

This is performed for the following reason. Since the moving member (driven member, for example, rotor) is in a kind of floating state to the stator while the vibrating type motor 22 generates standing wave vibration, and the focus lens 19 is readily moved by a small external force, the vibrating type motor 22 is made non-vibrating and completely stopped to hold an in-focus position. The stop of the application of the driving signal to the vibrating type motor 22 also has the effect of power savings.

[Step 406]

Since the content of the communication transmitted from the camera 58 is an instruction other than the focus lens driving signal and the driving stop instruction, processing is performed according to that other instruction and the sequence proceeds to step 402 at which the lens CPU 57 enters a wait state for communication.

[Step 407]

The lens CPU 57, upon reception of the focus lens driving instruction, determines whether or not the vibrating type motor 22 is vibrating in a standing wave. The sequence proceeds to step 409 if it is vibrating in a standing wave, or to step 408 if it is not vibrating in a standing wave but is non-vibrating (at a complete standstill).

[Step 408]

Since the vibrating type motor 22 is now non-vibrating, high frequency driving signals (cycle signals for the phases A, B) are applied to electrostrictive elements of the vibrating type motor 22 to cause the stator to generate traveling wave vibration, and the vibrating type motor 22 is actuated with the frequency being reduced gradually to drive the focus lens 19 toward a target position corresponding to a position after driving by a certain amount included in the focus lens driving instruction. At this point, the phase difference between the phase A and phase S is read to perform control such that the driving frequency does not fall below the resonance frequency f0.

[Step 409]

Since the vibrating type motor 22 is now vibrating in a standing wave, the driving signals for the phases A, B to the vibrating type motor 22 are switched from the phase difference for generating standing wave vibration to the phase difference for generating traveling wave vibration to actuate the vibrating type motor 22, and the focus lens 19 is driven toward the aforementioned target position. In this event, the phase difference between the phase A and phase S is also read to perform control such that the driving frequency does not fall below the resonance frequency f0.

The traveling wave vibration of the stator is generated by applying driving signals for the phases A, B having a phase difference of 90 degrees to the electrode A1 and the electrode B1 shown in FIG. 16. The driving direction may be switched by advancing or delaying the phase of the signal applied to the electrode B1 with respect to the signal applied to the electrode A1.

The standing wave vibration of the stator can be generated by applying a driving signal to one of the electrode A1 and the electrode B1 or applying driving signals with the same phase to the electrodes A1, B1. Driving signals with a phase difference of 180 degrees may be applied to the electrodes A1, B1.

[Step 410]

It is determined whether or not the focus lens 19 reaches the target position (whether or not it is driven by the certain amount), and if the target position is reached, the sequence proceeds to step 411. If the target position is not reached, the vibrating type motor 22 is driven until the target position is reached.

In this event, it is preferable that control is performed such that the driving amount remaining before the target position is reached is monitored and deceleration processing is performed at the time when the remaining driving amount becomes equal to or lower than a certain level to avoid overrun and prevent a user from feeling shock at the time of stop.

[Step 411]

Since the focus lens 19 reaches the target position, the driving signals for the phases A, B to the vibrating type motor 22 are switched from the phase difference for generating traveling wave vibration to the phase difference for generating standing wave vibration to stop (temporarily stop) the vibrating type motor 22 and the focus lens 19. The driving frequency when the traveling wave vibration is switched to the standing wave vibration is a startup frequency (the aforementioned high frequency) used for starting to actuate the vibrating type motor 22 by the traveling wave vibration.

Then, the sequence returns to step 402 at which the lens CPU 57 waits for the next driving instruction transmitted from the camera 58. During the wait, the vibrating type motor 22 is vibrating in a standing wave. The camera CPU 37 extracts higher frequency components in an image signal output from the image pickup device 31, detects the focus adjusting state of the image-taking optical system, and determines whether or not focusing (in-focus state) is achieved.

Upon reception of the next driving instruction from the camera 58, the lens CPU 57 switches the driving signals for the phases A, B to the vibrating type motor 22 to the phase difference for generating traveling wave vibration in order to perform the next driving of the focus lens 19.

In the embodiment, the vibrating type motor 22 is caused to vibrate in a standing wave each time the focus lens 19 is temporarily stopped after driving during the focus operation until focusing is achieved in the operation of the contrast detection scheme AF. Alternatively, it is possible that a time period until the focus lens 19 is moved to within a predetermined range (near the in-focus position) including the in-focus position is set as a first mode, a time period until the focus lens 19 is moved to the in-focus position in that predetermined range is set as a second mode, and the vibrating type motor 22 is caused to generate the standing wave vibration and not to be driven only at the time of temporary stop when the focus lens 19 is repeatedly driven by a small amount in the second mode.

In the respective embodiments described above, since the vibrating type motors 15, 22 vibrate in a standing wave so as not to drive the motors 15, 22 and the focus lenses 2, 19 during the temporary stop of the focus lenses 2, 19 while the contrast detection scheme AF is performed, the vibrating type motor 22 can be quickly actuated at the time of the next driving by a certain amount. Thus, it is possible to reduce a time taken for achieving focus. In addition, since the vibrating type motors 15, 22 are made non-vibrating to completely stop the driving when focus is achieved, the focus lenses 2, 19 can be fixed to hold the in-focus state.

While the respective embodiments described above have been described for the digital still camera of the type containing the image-taking lens and a combination of the digital still camera or the film camera and the interchangeable lens apparatus, the present invention is applicable to a video camera or a combination of a video camera and an interchangeable lens.

As described above, in the embodiments shown in FIGS. 1 to 7, since the stator of the vibrating type motor is not non-vibrating but vibrating in a standing wave during the stop of the focus lens in the focus operation in which the focus lens is repeatedly driven and stopped, the vibrating type motor can be actuated in a shorter time than is required for starting to actuate the vibrating type motor (that is, the focus lens) by switching the stator to traveling wave vibration from a non-vibrating state. Thus, in the contrast detection scheme or the contrast scheme AF which requires repeated driving and stop of the focus lens at high speed, the startup properties and drive-following properties of the focus lens can be improved to reduce time taken for achieving final focusing.

Figure 8:
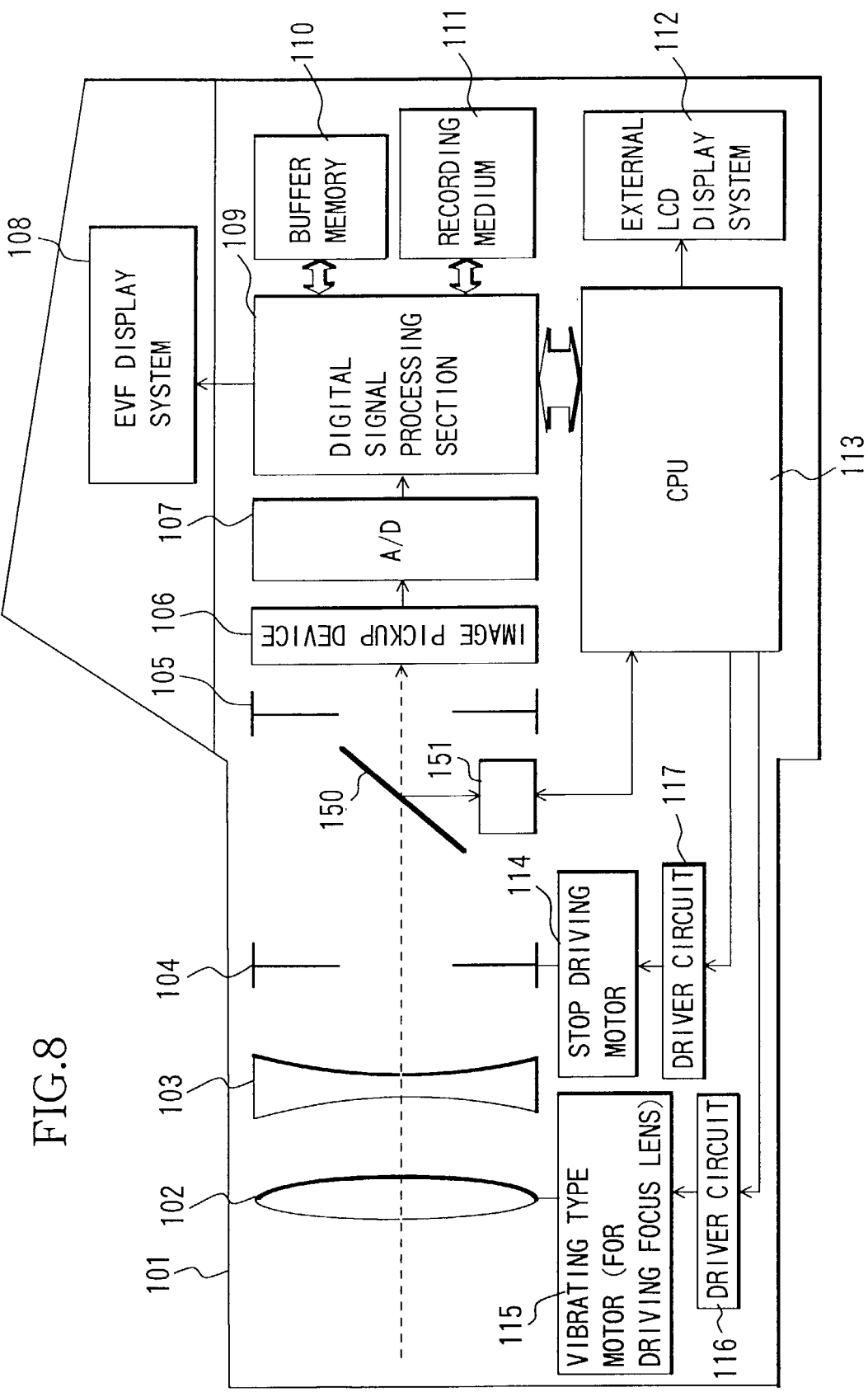
FIG. 8 is a block diagram showing the configuration of a digital camera which is another embodiment of the present invention.

FIG. 8 is a block diagram showing the configuration of a digital camera which contains an image-taking lens as an integral part and is another embodiment of the present invention. In FIG. 8, reference numeral 101 shows the digital camera (hereinafter simply referred to as a camera). In an image-taking optical system, reference numeral 102 shows a focus lens which performs focus adjustment, 103 a zoom lens which adjusts a magnification, 104 a stop which adjusts an amount of light. Reference numeral 106 shows an image pickup device such as a CCD and CMOS which photoelectrically converts image light to an image signal for output, and 105 a shutter which adjusts an amount of light to the image pickup device 106.

Reference numeral 107 shows an A/D converter which digitizes an image signal from the image pickup device 106, 108 an electrical viewfinder system which displays an image picked up by the image pickup device 106, 109 a digital signal processing section which performs various digital signal processing of a digital image signal converted by the A/D converter 107, 110 a buffer memory used to temporarily store the digital image signal or the like, and 111 a recording medium such as a flash memory or other semiconductor memory, magnetic disk, optical disk, etc. which records taken digital data.

Reference numeral 112 shows an external LCD display system which displays various image-taking information, and 113 a camera CPU responsible for various controls in the camera, 114 a stop driving motor, 115 a vibrating type motor which drives the focus lens 102, 116 a driver circuit which drives the vibrating type motor 115, and 117 a driver circuit which drives the stop driving motor 114. The camera 101 is equipped with a power source, although not shown. The image pickup device 106 and the camera CPU 113 constitute a second focus detection unit. The configuration and the operation of the vibrating type motor 115 are similar to those of the vibrating type motor described in the aforementioned respective embodiments.

Figure 12:
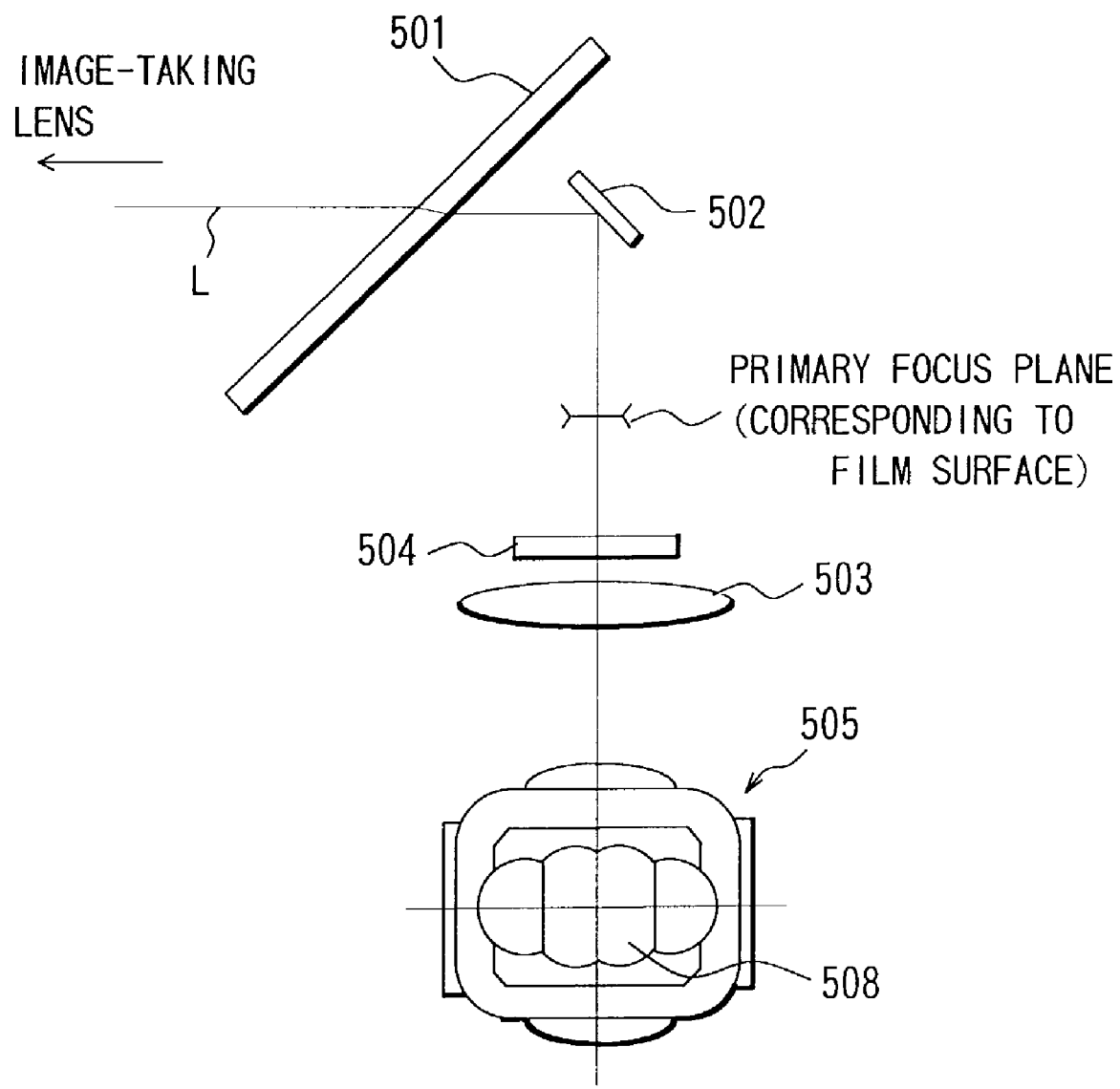
FIG. 12 shows the schematic configuration of an optical system for AF in a phase difference detection scheme.
Figure 13:
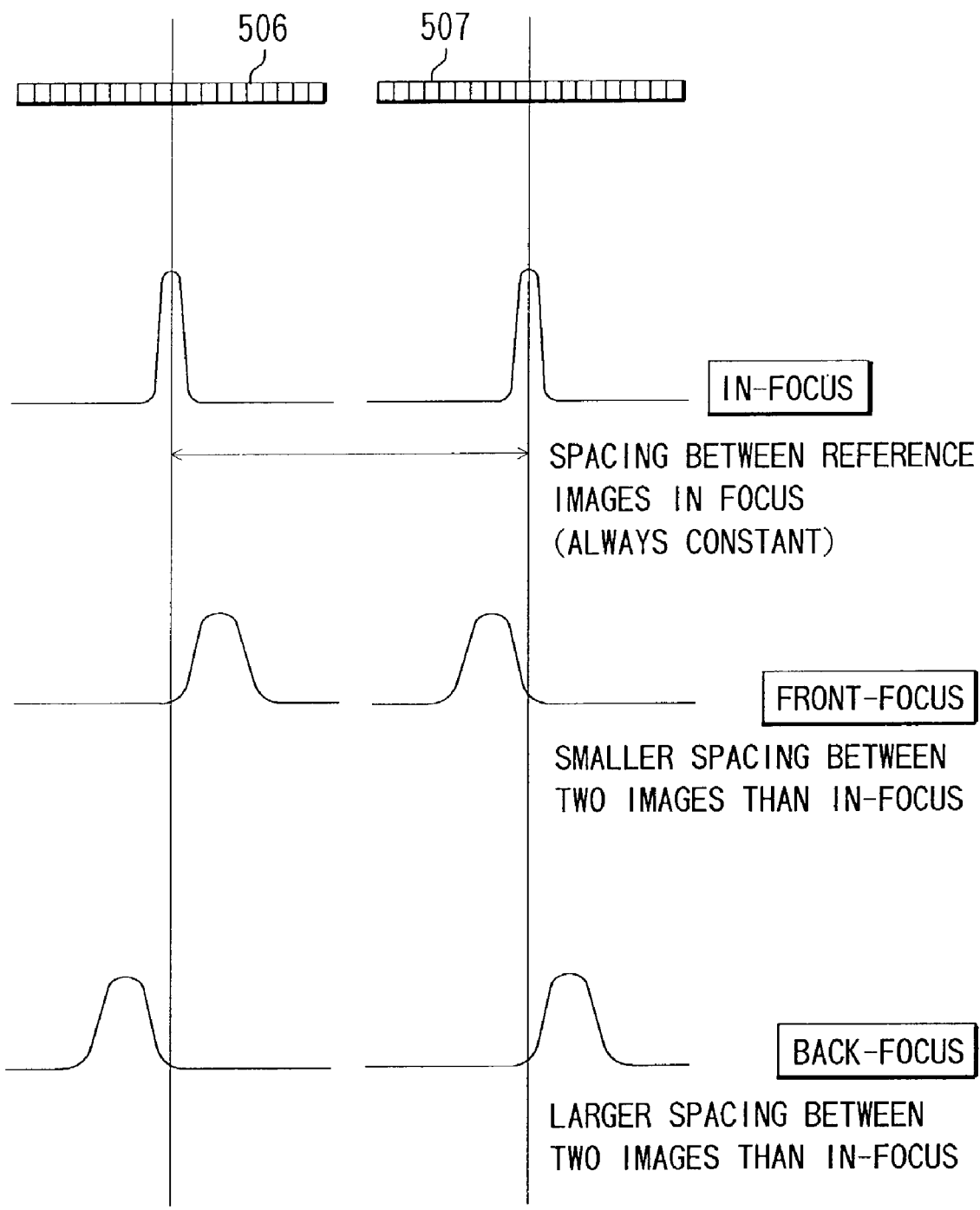
FIG. 13 shows an AF sensor and its output in phase difference detection scheme AF.
Figure 14:
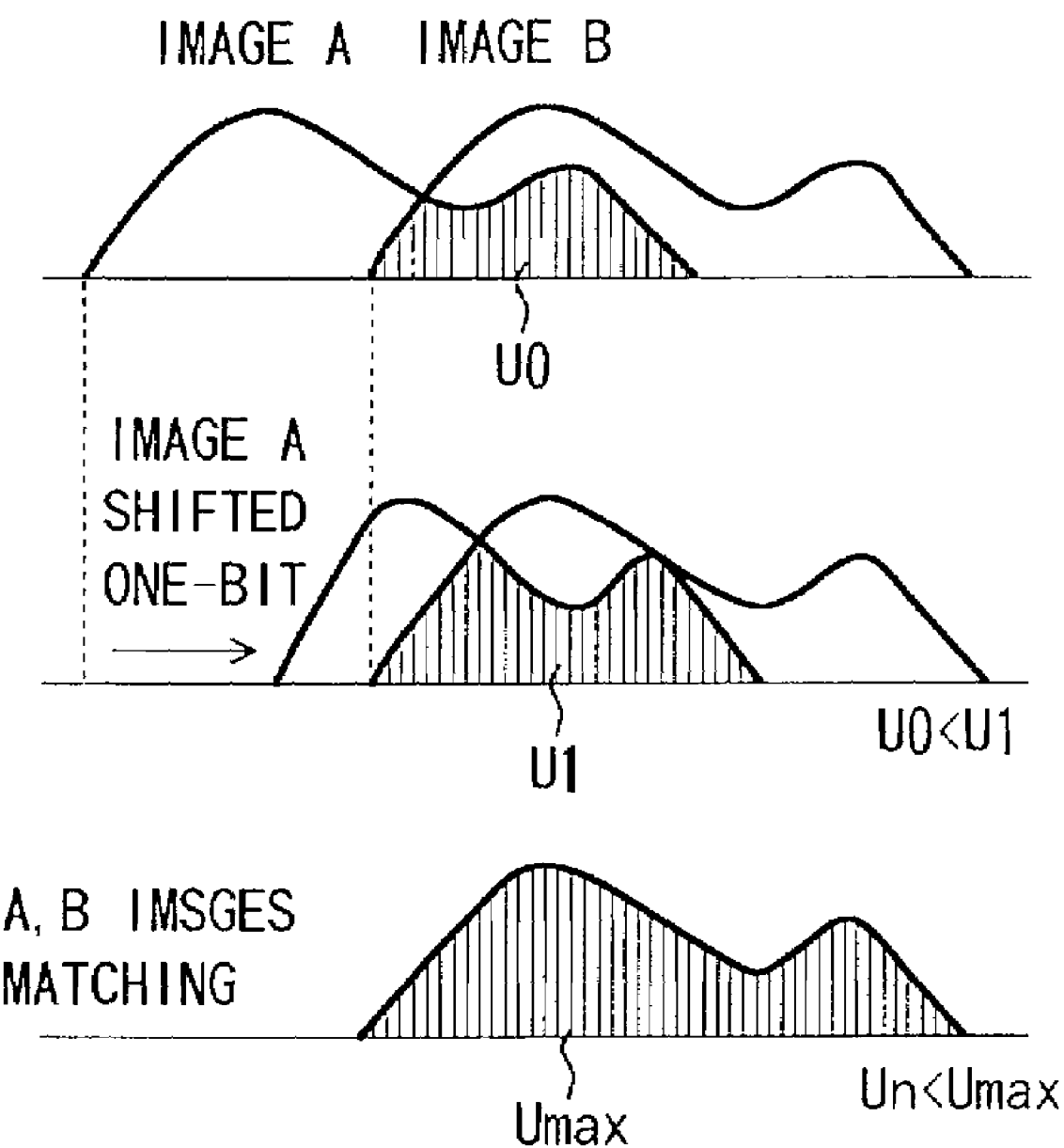
FIG. 14 shows plots for explaining calculations of correlation (MIN algorithm) between two images in the phase difference detection scheme AF.
Figure 15:
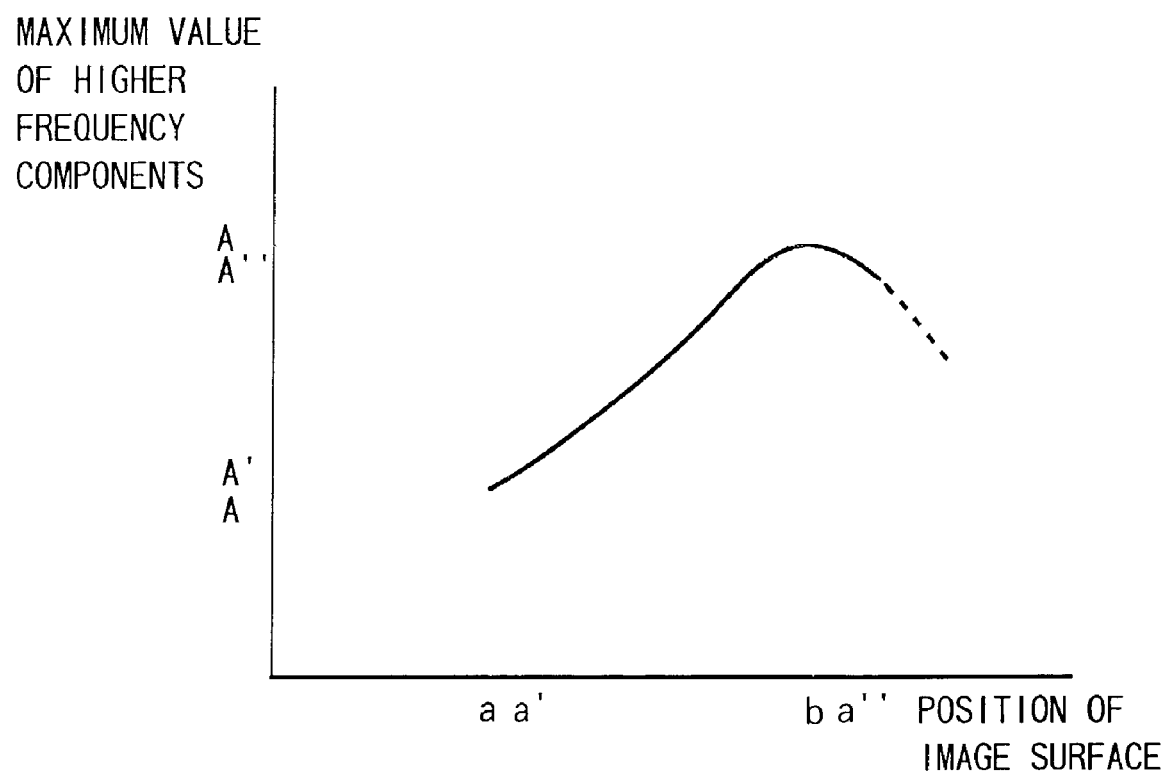
FIG. 15 is a chart showing the relationship between the position of a lens image surface and higher frequency components extracted from an image signal in the contrast detection scheme AF.

Reference numeral 150 shows a mirror unit and comprises a main mirror and a sub-mirror similarly to that shown in FIG. 12. Each of the main mirror and sub-mirror is formed of a half-mirror. Reference numeral 151 shows a phase difference scheme focus detection unit (a first focus detection unit) and comprises a secondary imaging optical system and an AF sensor similarly to that shown in FIG. 12.

Figure 9:
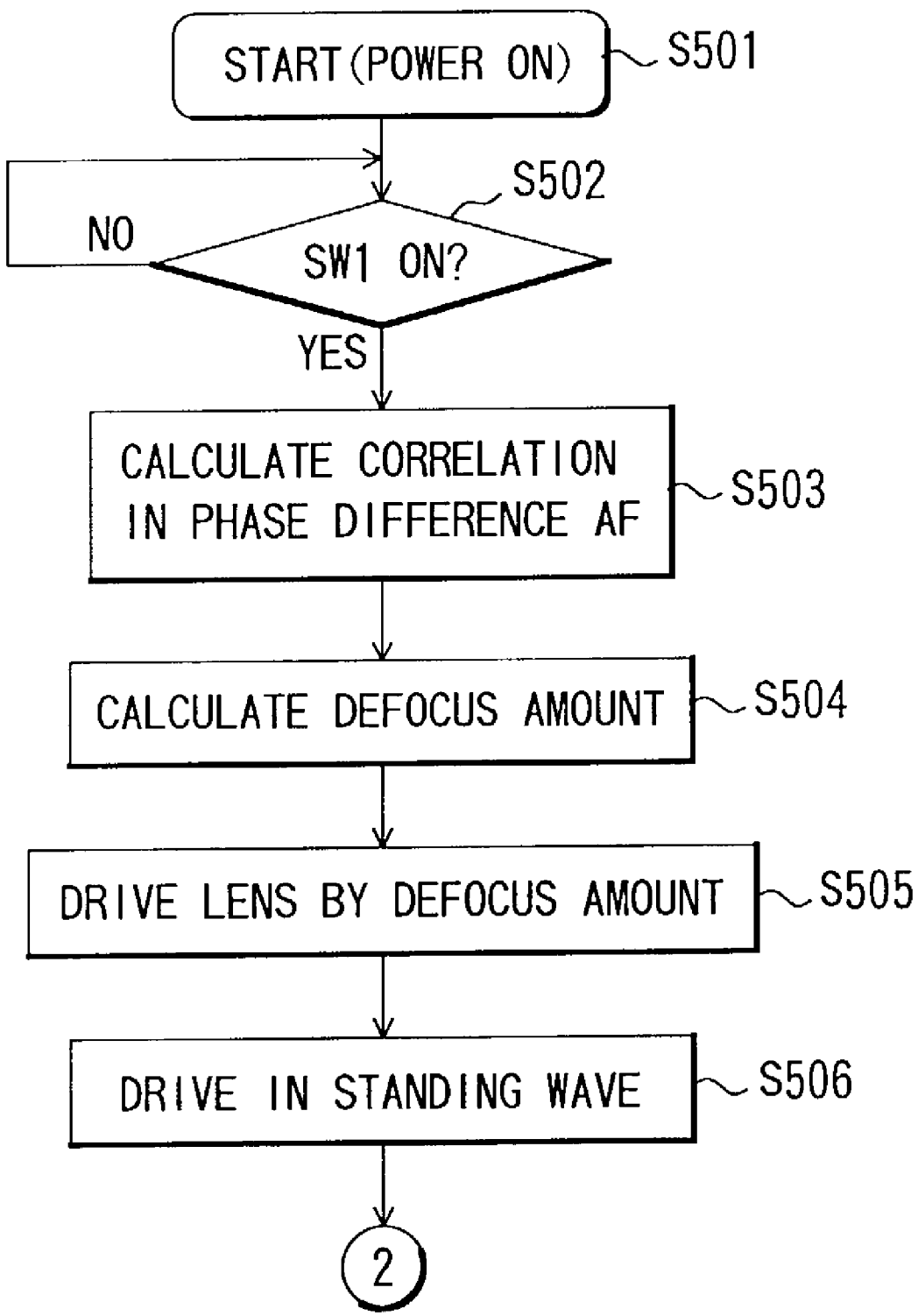
FIGS. 9(A) and (B) show a flow chart showing control of focusing operation in the digital camera of the embodiment shown in FIG. 8.
Figure 9:
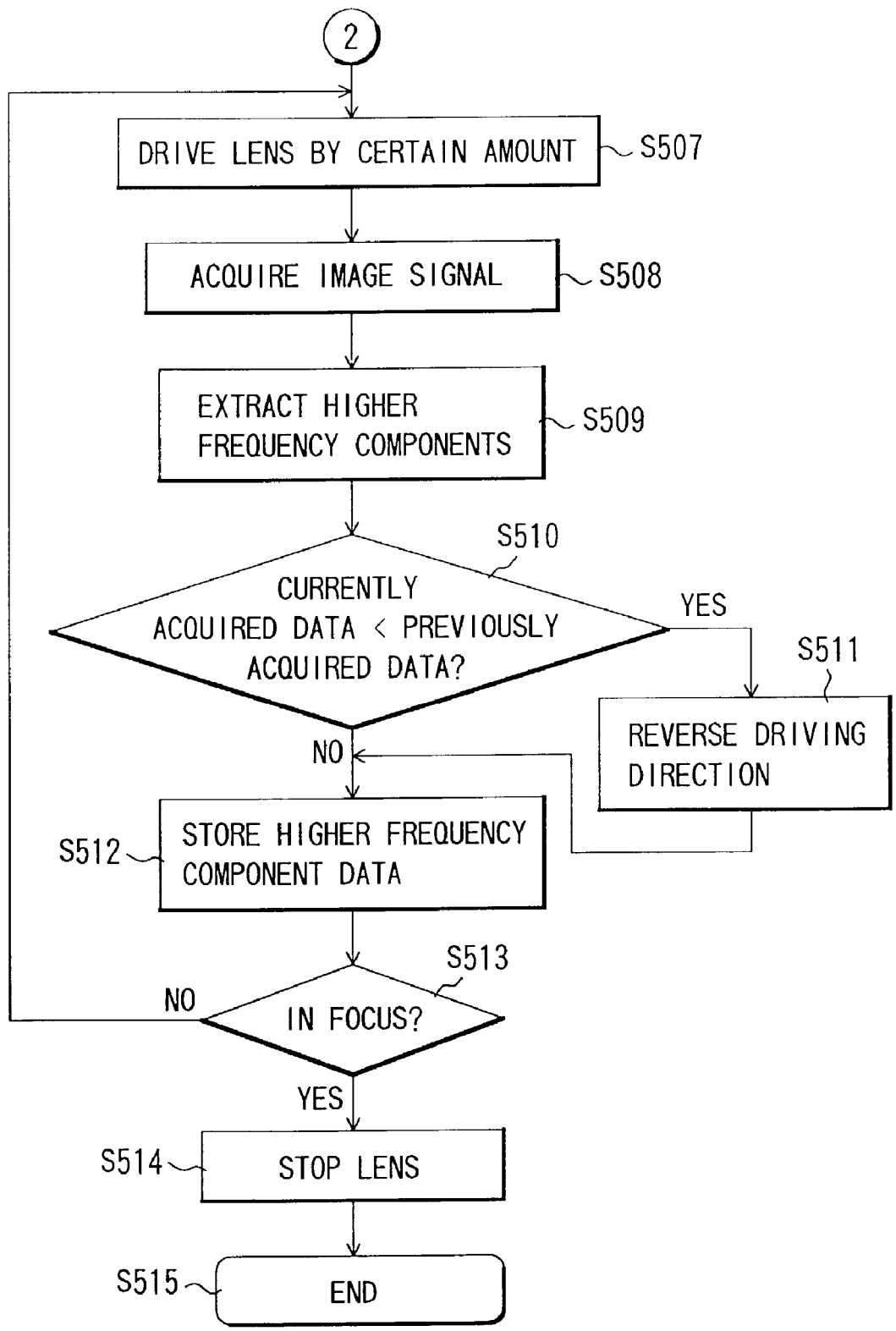

Next, description is made for the focus adjusting operation in the camera 101 (mainly of the camera CPU 113) of the embodiment with reference to a flow chart of FIG. 9(A) and FIG. 9(B). Lines added circled 2 in FIG. 9(A) and FIG. 9(B) are connected to each other.

[Step 501]

When a power switch, not shown, is turned ON, power is supplied to the camera CPU 113 and this processing is started.

[Step 502]

The camera CPU 113 determines whether or not a release button, not shown, provided for the camera 101 is half-pressed to turn an image-taking preparation switch SW1 ON. The sequence proceeds to step 503 if it is turned on, or the camera CPU 113 enters a standby state if it is OFF.

[Step 503]

The camera CPU 113 calculates "an amount of correlation" in the phase difference scheme AF based on output from the phase difference scheme focus adjustment unit 151 to perform first-stage driving control (that is, focusing control) for achieving focusing in the vibrating type motor 115.

[Step 504]

The camera CPU 113 calculates a defocus amount of the image-taking lens based on the correlation amount calculated at step 503 and optical data such as focus sensitivity of the image-taking lens.

[Step 505]

The camera CPU 113 controls the driver circuit 116 to drive the vibrating type motor 115 for acceleration and deceleration based on the defocus amount calculated at step 504. The driving of the vibrating type motor 115 is stopped at the time when the movement of the focus lens 102 by a predetermined amount is detected from output from an encoder (not shown). The first-stage focusing control with rough positional resolution is then ended.

[Step 506]

The camera CPU 113 proceeds to intermediate control for generating standing wave vibration on the stator of the vibrating type motor 115 immediately after the completion of the first-stage focusing control at step 505. Higher frequency components are extracted from an image signal output from the image pickup device 106 for performing second-stage focusing control as below.

The standing wave can be generated by applying a driving signal to one of the electrodes A1, B1 shown in FIG. 16 or applying driving signals with the same phases to the electrodes A1, B1. Driving signals with a phase difference of 180 degrees may be applied to the electrodes A1, B1.

The standing wave vibration generated on the stator in this manner causes the rotor (driven member) to be in a floating state to the stator. Consequently, startup properties are improved when the stator is next caused to vibrate in a traveling wave to actuate the rotor (that is, the focus lens 102).

[Step 507]

The camera CPU 113 drives the focus lens 102 by a certain amount to perform the second-stage focusing control with fine resolution. In this event, the driving amount may be always constant or may be changed in accordance with the newest value of the higher frequency component data. For example, when the value of the higher frequency component data extracted at step 506 is small, the focus lens 102 is considered as being at some distance from an in-focus position and the driving amount is increased, and when the value of the higher frequency component data is large, the focus lens 102 is considered as being near the in-focus position and the driving amount is reduced.

During the transition from step 506 to 507, the vibrating type motor 115 is not driven while the stator is vibrating (in a standing wave) by the aforementioned intermediate control. Thus, at step 507, high frequency driving signals are applied to the stator of the vibrating type motor 115 to form a traveling wave, and the vibrating type motor 115 is actuated with the frequency being gradually reduced.

In this event, the phase difference between the phase A and phase S described above is read to perform control such that the driving frequency does not fall below the resonance frequency f0.

The traveling wave can be generated by applying driving signals with a phase difference of 90 degrees to the electrode A1 and the electrode B1 shown in FIG. 16. The driving direction may be switched by advancing or delaying the phase of the signal applied to the electrode B1 with respect to the signal applied to the electrode A1.

After the driving by the certain amount, the driving signal to the vibrating type motor 115 is switched from one for generating a traveling wave to one for generating a standing wave to cause the stator to generate standing wave vibration, and the focus lens 102 is temporarily stopped. The driving frequency when the traveling wave vibration is switched to the standing wave vibration is a startup frequency (the aforementioned high frequency) used for starting to actuate the vibrating type motor 115 by the traveling wave vibration.

[Step 508]

The camera CPU 113 causes the digital signal processing section 109 to acquire the image signal from the image pickup device 106.

[Step 509]

The camera CPU 113 extracts higher frequency components from the image signal acquired by the digital signal processing section 109 at step 508.

[Step 510]

The camera CPU 113 compares the previously extracted higher frequency component data with the higher frequency component data extracted this time. If the previously extracted data shows a larger value, the in-focus position is determined as being opposite to the current moving direction of the focus lens 102 and the sequence proceeds to step 511, or otherwise, the in-focus position is determined as matching the current moving direction of the focus lens 102 and the sequence proceeds to step 512. Up to this point, the vibrating type motor 115 is driven to vibrate in a standing wave.

[Step 511]

The camera CPU 113 makes setting to reverse the next driving direction of the focus lens 102 to the current driving direction.

[Step 512]

The camera CPU 113 temporarily stores the higher frequency component data extracted at step 509 in the buffer memory 110.

[Step 513]

The camera CPU 113 determines whether or not focusing (in-focus state) is achieved from the stored value of the higher frequency component data, the condition whether the focus lens 102 is reversely driven near the current position of the focus lens 102, and the like.

When it is determined that focus is achieved, the sequence proceeds to step 514, or when it is determined that focusing is not achieved, the sequence returns to step 507 and the next driving of the focus lens 102 is performed. Specifically, the vibrating type motor 115 is switched from the standing wave driving to the traveling wave driving and is driven by the certain amount.

[Step 514]

The camera CPU 113 stops the driving of the focus lens 102 since focusing is achieved at step 513. In this event, the vibrating type motor 115 vibrating in a standing wave is completely stopped by terminating the application of the driving signal.

This is performed for the following reason. Since the rotor of the vibrating type motor is floating to the stator in the standing wave vibration, and the focus lens 102 is readily moved by a small external force and the in-focus position cannot be maintained, the standing wave vibration is stopped to produce friction force from press contact of the stator with the rotor, thereby maintaining the in-focus position. In addition, the stop of the standing wave vibration has the effect of power savings.

As described above, according to the embodiment, the vibrating type motor 115 is caused to vibrate in a standing wave by the intermediate control from the end of the first-stage driving control of the vibrating type motor 115, that is, the focusing control of the focus lens 102 based on the detection result of the focus adjustment state in the phase difference detection scheme until the start of the second-stage driving control, that is, the focusing control of the focus lens 102 based on the detection result of the focus adjustment state in the contrast detection scheme. Thus, driving of the focus lens 102 can be quickly started in the second-stage driving control.

In addition, since the vibrating type motor 115 is also caused to vibrate in a standing wave during the temporary stop of the focus lens 102 while higher frequency components are extracted and focus determination is made after the driving of the focus lens 102 by the certain amount in the second-stage driving control, the next driving of the focus lens 102 by the certain amount can be quickly started. Thus, focusing can be achieved more accurately in a shorter time than in the conventional hybrid scheme AF.

Figure 10:
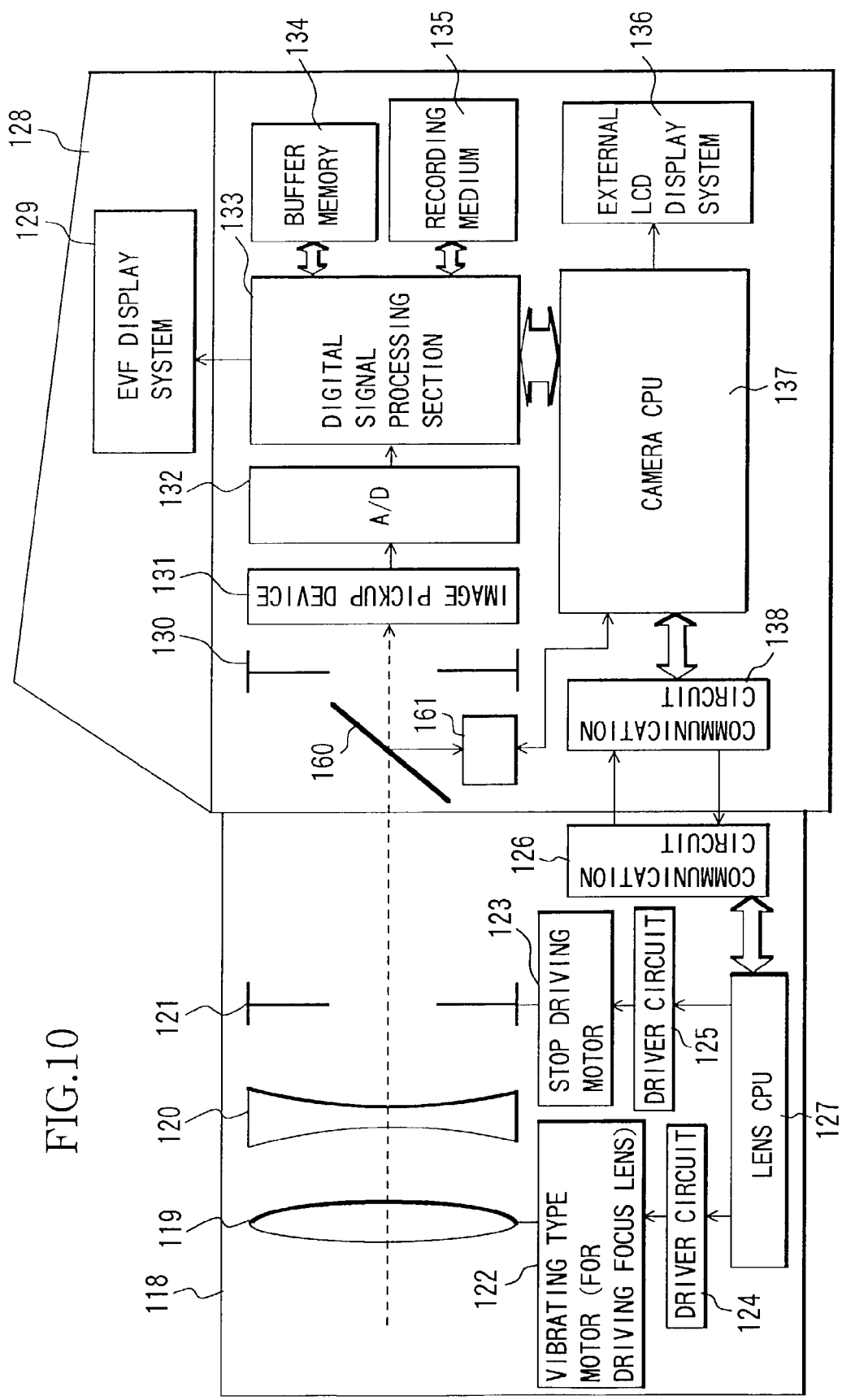
FIG. 10 is a block diagram showing the configuration of a digital camera system which is another embodiment of the present invention.

FIG. 10 is a block diagram showing the configuration of a camera system which is another embodiment of the present invention and comprises a digital camera (hereinafter simply referred to as a camera) and an interchangeable lens removably mounted on the camera.

In FIG. 10, reference numeral 118 shows the interchangeable lens. In an image-taking optical system of the interchangeable lens 118, reference numeral 119 shows a focus lens which performs focus adjustment, 120 a zoom lens which adjusts a magnification, and 121 a stop which adjusts an amount of light.

Reference numeral 122 shows a vibrating type motor which drives the focus lens 119, 123 a stop driving motor, 124 a driver circuit which drives the vibrating type motor 122, 125 a driver circuit which drives the stop driving motor 123, 126 and 138 communication circuits which perform communication of data or the like with the camera, and 127 a lens CPU responsible for control in the interchangeable lens 18.

On the other hand, reference numeral 128 shows the digital camera, 129 an electrical viewfinder system, 131 an image pickup device such as a CCD and a CMOS which photoelectrically converts image light to an image signal for output, 130 a shutter which adjusts an amount of light reaching the image pickup device 131, 132 an A/D converter which digitizes an image signal from the image pickup device 131, 133 a digital signal processing section which performs various digital signal processing of a digital image signal converted by the A/D converter 132, and 134 a buffer memory used to temporarily store the digital image signal or the like.

Reference numeral 135 shows a recording medium such as a flash memory or other semiconductor memory, magnetic disk, optical disk, etc. which records taken digital data, 136 an external LCD display system which displays various image-taking information, 137 a camera CPU responsible for control in the camera, and 138 a communication circuit which performs communication of data or the like with the interchangeable lens 118. The camera 128 is equipped with a power source, although not shown, and the interchangeable lens 118 is also supplied with power from the power source. The image pickup device 131 and the camera CPU 137 constitute a second focus detection unit.

Reference numeral 160 shows a mirror unit and comprises a main mirror and a sub-mirror similarly to that shown in FIG. 12. Each of the main mirror and sub-mirror is formed of a half-mirror. Reference numeral 161 shows a phase difference scheme focus detection unit (a first focus detection unit) and comprises a secondary imaging optical system and an AF sensor similarly to that shown in FIG. 12.

The configuration and the operation of the vibrating type motor 122 are similar to those of the vibrating type motor described in the aforementioned respective embodiments.

Figure 11:
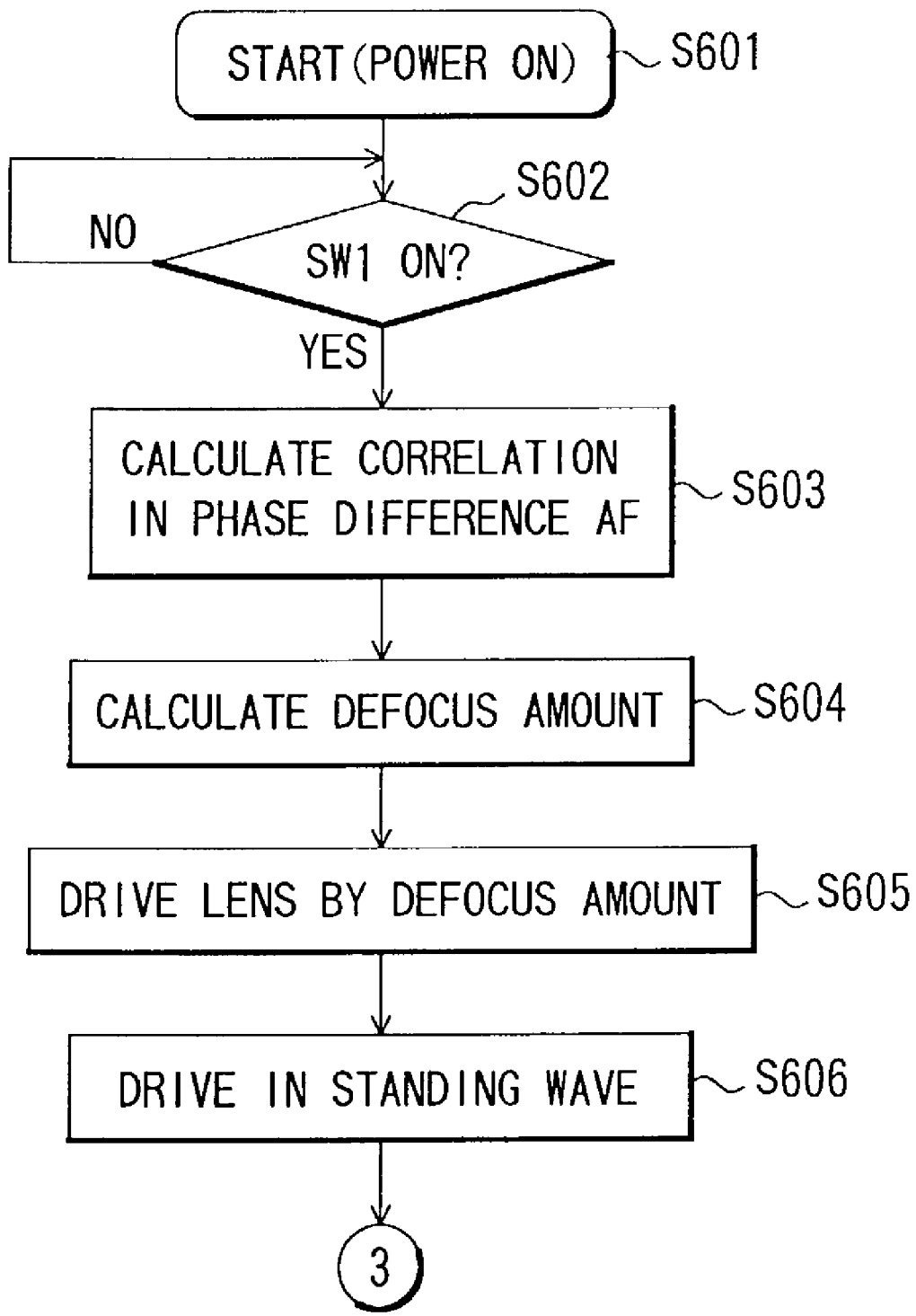
FIGS. 11(A) and (B) show a flow chart showing control of focusing operation in the digital camera system of the embodiment shown in FIG. 10.
Figure 11:
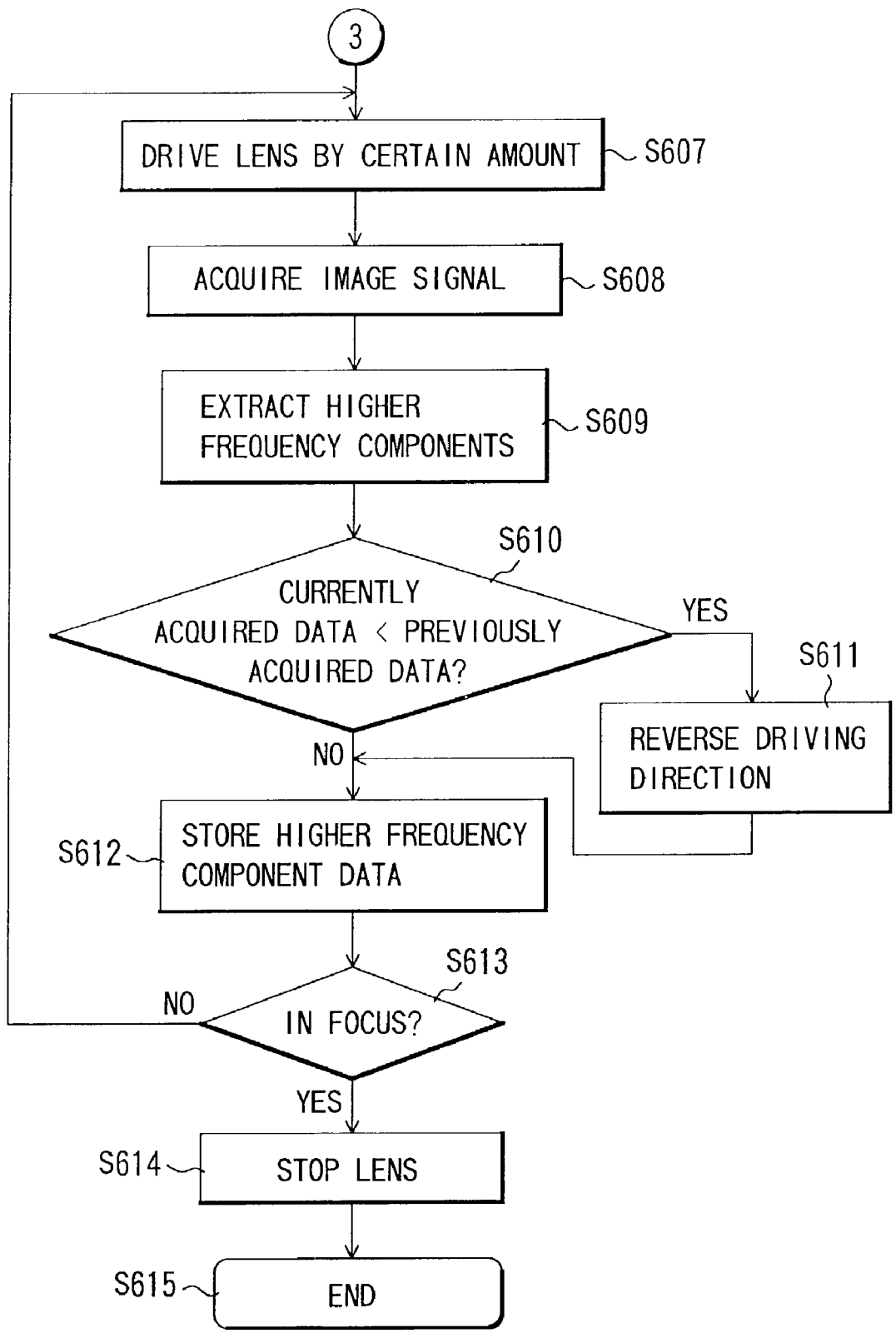

Next, the focus adjusting operation of the camera system (mainly of the camera CPU 137 and the lens CPU 127) of the embodiment is described with reference to a flow chart of FIG. 11(A) and FIG. 11(B). Lines added circled 3 in FIG. 11(A) and FIG. 11(B) are connected to each other.

[Step 601]

The camera CPU 137 starts processing in response to turn-on of a power switch, not shown, provided for the camera 128.

[Step 602]

The camera CPU 137 determines whether or not a release button, not shown, provided for the camera 128 is half-pressed to turn an image-taking preparation switch SW1 ON. The sequence proceeds to step 603 if it is turned on, or the camera CPU 137 enters a standby state if it is OFF.

[Step 603]

The camera CPU 137 calculates "an amount of correlation" in the phase difference scheme AF based on output from the phase difference scheme focus adjustment unit 161 to perform first-stage driving control (that is, focusing control) for achieving focusing in the vibrating type motor 122.

[Step 604]

The camera CPU 137 calculates a defocus amount of the image-taking lens based on the correlation amount calculated at step 603 and optical data such as focus sensitivity of the image-taking lens previously transmitted from the lens CPU 127 through the communication circuits 126, 138.

[Step 605]

The camera CPU 137 communicates a lens driving instruction to the lens CPU 127 through the communication circuits 138, 126. The lens CPU 127 drives the vibrating type motor 122 for acceleration and deceleration through the driver circuit 124. Output from an encoder (not shown) provided in the interchangeable lens 118 is transmitted to the camera CPU 137 from the lens CPU 127 through the communication circuits 126, 138. At the time when the camera CPU 137 detects that the focus lens 119 is moved by a predetermined amount corresponding to the aforementioned defocus amount, the camera CPU 137 transmits a lens driving stop instruction to the lens CPU 127 to stop the driving of the vibrating type motor 122, thereby ending the first-stage focusing control with rough position resolution.

[Step 606]

The camera CPU 137 transmits a standing wave driving instruction to the lens CPU 127 immediately after the completion of the first-stage focusing control. The lens CPU 127 proceeds to intermediate control for generating standing wave vibration on the stator of the vibrating type motor 122 through the driver circuit 124. At this time, the camera CPU 137 extracts higher frequency components from an image signal output from the image pickup device 131 in order to perform second-stage focusing control.

The standing wave can be generated by applying a driving signal to one of the electrodes A1, B1 shown in FIG. 16 or applying driving signals with the same phases to the electrodes A1, B1. Driving signals with a phase difference of 180 degrees may be applied to the electrodes A1, B1.

The standing wave vibration generated on the stator in this manner causes the rotor to be in a floating state to the stator. Consequently, startup properties are improved when the stator is next caused to vibrate in a traveling wave to actuate the rotor (that is, the focus lens 119).

[Step 607]

The camera CPU 137 transmits a certain amount driving instruction to the lens CPU 127. The lens CPU 127 causes traveling wave vibration to be generated on the stator of the vibrating type motor 122 through the driver circuit 124 to drive the focus lens 119 by a certain amount.

In this event, the driving amount may be always constant or may be changed in accordance with the newest value of the higher frequency component data. For example, when the value of the higher frequency component data extracted at step 606 is small, the focus lens 119 is considered as being at some distance from an in-focus position and the driving amount is increased, and when the value of the higher frequency component data is large, the focus lens 119 is considered as being near the in-focus position and the driving amount is reduced.

During the transition from step 606 to 607, the vibrating type motor 122 is not driven while the stator is vibrating (in a standing wave) by the aforementioned intermediate control. Thus, at step 607, high frequency driving signals are applied to the stator of the vibrating type motor 122 to form a traveling wave, and the vibrating type motor 122 is actuated with the frequency being gradually reduced.

In this event, the phase difference between the phase A and phase S described above is read to perform control such that the driving frequency does not fall below the resonance frequency f0.

The traveling wave can be generated by applying driving signals with a phase difference of 90 degrees to the electrode A1 and the electrode B1 shown in FIG. 16. The driving direction may be switched by advancing or delaying the phase of the signal applied to the electrode B1 with respect to the signal applied to the electrode A1.

After the driving by the certain amount, the driving signal to the vibrating type motor 122 is switched from one for generating a traveling wave to one for generating a standing wave to generate standing wave vibration on the stator, and the focus lens 119 is temporarily stopped.

[Step 608]

The camera CPU 137 causes the digital signal processing section 133 to acquire the image signal from the image pickup device 131.

[Step 609]

The camera CPU 137 extracts higher frequency components from the image signal acquired by the digital signal processing section 133 at step 608.

[Step 610]

The camera CPU 137 compares the previously extracted higher frequency component data with the higher frequency components extracted this time. If the previously extracted data shows a larger value, the in-focus position is determined as being opposite to the current moving direction of the focus lens 119 and the sequence proceeds to step 611, or otherwise, the in-focus position is determined as matching the current moving direction of the focus lens 119 and the sequence proceeds to step 612.

[Step 611]

The camera CPU 137 makes setting to reverse the next driving direction of the focus lens 119 to the current driving direction.

[Step 612]

The camera CPU 113 temporarily stores the data on the higher frequency components extracted at step 609 in the buffer memory 134.

[Step 613]

The camera CPU 137 determines whether or not focusing (in-focus state) is achieved from the stored value of the higher frequency component data, the condition whether the focus lens 119 is reversely driven near the current position of the focus lens 119, and the like.

When it is determined that focusing is achieved, the sequence proceeds to step 614, or when it is determined that focusing is not achieved, the sequence returns to step 607 and the next driving of the focus lens 119 is performed.

[Step 614]

Since focusing is achieved at step 613, the camera CPU 137 stops the driving of the focus lens 119. In this event, the vibrating type motor 122 vibrating in a standing wave is completely stopped by terminating the application of the driving signal. This is performed for the following reason. Since the rotor of the vibrating type motor is floating to the stator in the standing wave vibration, and the focus lens 119 is readily moved by a small external force and the in-focus position cannot be maintained, the standing wave vibration is stopped to produce friction force from press contact of the stator with the rotor, thereby maintaining the in-focus position. In addition, the stop of the standing wave vibration has the effect of power savings.

As described above, according to the embodiment, the vibrating type motor 122 is caused to vibrate in a standing wave by the intermediate control from the end of the first-stage driving control of the vibrating type motor 122, that is, the focusing control of the focus lens 119 based on the detection result of the focus adjustment state in the phase difference detection scheme until the start of the second-stage driving control, that is, the focusing control of the focus lens 119 based on the detection result of the focus adjustment state in the contrast detection scheme. Thus, driving of the focus lens 119 can be quickly started in the second-stage driving control.

In addition, since the vibrating type motor 122 is also caused to vibrate in a standing wave during the temporary stop of the focus lens 119 while higher frequency components are extracted and focus determination is made after the driving of the focus lens 119 by the certain amount in the second-stage driving control, the next driving of the focus lens 119 by the certain amount can be quickly started. Thus, focusing can be achieved more accurately in a shorter time than in the conventional hybrid scheme AF.

While the AF sensor used in the phase difference detection scheme AF is provided below the mirror unit 150, 160 in the aforementioned embodiments, the present invention is not limited to such a configuration. The present invention may have a configuration having the AF sensor arranged on an imaging surface of a secondary imaging optical system additionally provided above the mirror unit.

As described above, according to the respective embodiments shown in FIGS. 8 to 11, the stator of the vibrating type motor is caused to generate standing wave veneration from the end of the first-stage driving control of the vibrating type motor (the driving of the focus lens based on the detection result of the focus adjustment state in the phase difference detection scheme) performed by driving the focus lens for achieving focusing until the start of the second-stage driving control (the driving of the focus lens based on the detection result of the focus adjustment state in the contrast detection scheme). Thus, driving of the focus lens in the image-taking system can be quickly started in the second-stage driving control, and focus can be achieved more accurately in a shorter time than in the conventional hybrid scheme AF.

While preferred embodiments have been described, it is to be understood that modification and variation of the present invention may be made without departing from the sprit or scope of the following claims.

What is claimed is:

1. A camera comprising: an image-taking optical system which forms an optical image by luminous flux from a subject and includes a focus lens; an image pickup device which photoelectrically converts the optical image formed by said image-taking optical system to an image signal and outputs the image signal; a vibrating type motor which drives said focus lens, said vibrating type motor including a vibrating member, an electro-mechanical energy conversion element which excites vibration on said vibrating member, and a driven member driven by the vibration of said vibrating member; and a control circuit which controls said vibrating type motor to repeatedly drive and stop said focus lens, extracts higher frequency components from the image signal obtained from said image pickup device in each stopped state of said focus lens, and performs focus adjusting operation of moving said focus lens to an in-focus position in accordance with a focus adjustment state of said image-taking optical system determined on the basis of said higher frequency components, wherein said control circuit causes traveling wave vibration to be generated on the vibrating member of said vibrating type motor when said focus lens is driven and causes standing wave vibration to be generated on said vibrating member while said focus lens is stopped during said focus adjusting operation, and wherein said control circuit has a first mode for driving said focus lens to near the in-focus position and a second mode for driving said focus lens from near the in-focus position to the in-focus position, and said control circuit causes traveling wave vibration to be generated on the vibrating member of said vibrating type motor when said focus lens is driven and causes standing wave vibration to be generated on said vibrating member while said focus lens is stopped only in said second mode.

* * * * *